(12) United States Patent
Mishina et al.

(10) Patent No.: US 6,511,534 B1
(45) Date of Patent: Jan. 28, 2003

(54) INK, INK SET, INK CARTRIDGE, PRINTING UNIT, IMAGE PRINTING APPARATUS, INK-JET PRINTING METHOD, AND COLORING MATERIAL

(75) Inventors: Shinya Mishina, Kawasaki (JP); Shinichi Sato, Kawasaki (JP); Mikio Sanada, Yokohama (JP); Koichi Osumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/660,503

(22) Filed: Sep. 12, 2000

(30) Foreign Application Priority Data

Sep. 17, 1999 (JP) .............................. 11-264641
Sep. 8, 2000 (JP) ....................... 2000-272934

(51) Int. Cl.$^7$ ............................................. C09D 11/00
(52) U.S. Cl. ................... 106/31.33; 106/31.36; 106/31.37; 106/31.4; 106/31.41; 106/31.65; 106/31.68; 106/31.69; 106/31.72; 106/31.73
(58) Field of Search .................. 106/31.33, 31.36, 106/31.37, 31.38, 31.39, 31.4, 31.41, 31.65, 31.68, 31.69, 31.7, 31.71, 31.72, 31.73

(56) References Cited

U.S. PATENT DOCUMENTS

| 4,313,124 | A | 1/1982 | Hara ......................... 346/140 R |
| 4,345,262 | A | 8/1982 | Shirato et al. ............ 346/140 R |
| 4,459,600 | A | 7/1984 | Sato et al. ................ 346/140 R |
| 4,463,359 | A | 7/1984 | Ayata et al. ................... 346/1.1 |
| 4,558,333 | A | 12/1985 | Sugitani et al. .......... 346/140 R |
| 4,608,577 | A | 8/1986 | Hori ......................... 346/140 R |
| 4,692,188 | A | 9/1987 | Ober et al. ..................... 106/23 |
| 4,723,129 | A | 2/1988 | Endo et al. .................... 346/1.1 |
| 4,740,796 | A | 4/1988 | Endo et al. .................... 346/1.1 |
| 5,218,376 | A | 6/1993 | Asai ............................. 346/1.1 |
| 5,395,434 | A | 3/1995 | Tochihara et al. ......... 106/22 R |
| 5,451,251 | A | 9/1995 | Mafune et al. ............. 106/22 H |
| 5,482,545 | A | 1/1996 | Aoki et al. ................ 106/22 K |
| 5,485,188 | A | 1/1996 | Tochihara et al. ........... 347/100 |
| 5,571,313 | A | 11/1996 | Mafune et al. ............. 106/22 H |
| 5,835,116 | A | 11/1998 | Sato et al. ...................... 347/98 |
| 5,911,815 | A | 6/1999 | Yamamoto et al. ....... 106/31.27 |
| 5,961,704 | A | * 10/1999 | Nakamura et al. ......... 106/31.32 |
| 5,976,233 | A | 11/1999 | Osumi et al. .............. 106/31.86 |
| 6,203,603 | B1 | * 3/2001 | Takayama et al. ......... 106/31.16 |
| 6,280,513 | B1 | * 8/2001 | Osumi et al. ............... 106/31.6 |

FOREIGN PATENT DOCUMENTS

| JP | 54-56847 A | 5/1979 |
| JP | 55-65269 A | 5/1980 |
| JP | 55-66976 A | 5/1980 |
| JP | 59-123670 A | 7/1984 |
| JP | 59-138461 A | 8/1984 |
| JP | 60-71260 A | 4/1985 |
| JP | 62-95366 A | 5/1987 |
| JP | 1-170672 A | 7/1989 |
| JP | 9-151342 A | 6/1997 |
| JP | 2783647 B2 | 8/1998 |

* cited by examiner

*Primary Examiner*—Helene Klemanski
*Assistant Examiner*—Veronica F. Faison
(74) *Attorney, Agent, or Firm*—Fitzpatrick, Cella, Harper & Scinto

(57) ABSTRACT

An ink is provided which is capable of giving higher density of the printed image and has improved color developability with the light fastness and image stability maintained, and suppressing occurrence of bleeding in color image formation. The ink contains a capsuled coloring material constituted of a water-insoluble coloring material and an organic polymer covering the coloring material, the capsuled coloring material containing the organic polymer at a content ranging from 1% by weight to 20% by weight.

25 Claims, 18 Drawing Sheets

MOVING DIRECTION OF CARRIAGE

BLACK INK
CYAN INK
MAGENTA INK
YELLOW INK

INK, INK SET, INK CARTRIDGE, PRINTING UNIT, IMAGE PRINTING APPARATUS, INK-JET PRINTING METHOD, AND COLORING MATERIAL

BACKGROUND OF THE INVENTION

1. Field of the Invention

The. present. invention relates to an ink (printing liquid) useful for writing utensils such as aqueous ball point pens, fountain pens, and felt-tip pens; on-demand type ink-jet printers of a thermal jet type, a piezo type, and the like; an ink set; an ink cartridge; a printing unit; an image printing apparatus; an ink-jet printing method employing the ink; and a coloring material for the ink.

2. Related Background Art

Dyes are used as the coloring material for inks for high color developability and high stability. However, the dyes are not satisfactory in water-resistance and light-fastness of the formed images, disadvantageously in spite of having several advantages, and therefore more improvement is required. In recent years, for offsetting the disadvantages, various inks are disclosed which employ a water-insoluble coloring material such as organic pigments and carbon black in place of the dyes.

However, even with the coloring material like an organic pigment or carbon black, the formed images are not satisfactory in rub resistance (for example, by rubbing with a finger, or overwriting with a felt-tipped pen). To solve this problem, use of a microcapsule is disclosed.

Japanese Patent Application Laid-Open No 1-170672 discloses an ink employing a capsuled coloring material prepared by dissolving or dispersing a coloring material in a water-insoluble solvent, dispersing and emulsifying the solution with a surfactant, and encapsulating the coloring material. Japanese Patent Application Laid-Open No. 62-95366 discloses an ink enclosing a dye ink in polymer particles. Japanese Patent Application Laid-Open No. 9-151342 discloses an aqueous liquid dispersion for printing liquid containing anionic microencapsulated pigment; the capsulated pigment containing the pigment at a content ranging from 35% by weight to 80% by weight.

SUMMARY OF THE INVENTION

The inventors of the present invention investigated comprehensively inks containing an organic pigment or carbon black microencapsulated. As the results, it was found that the ink containing the microencapsulated organic pigment gave insufficient color chroma, and was not able to provide an image having enough optical density, although such an ink has improved rub resistance with the image stability, such as light-fastness, maintained. Therefore, the insufficient color chroma or the optical density should be improved for a higher quality of image.

The inventors of the present invention confirmed that the above disadvantages are caused by covering of the organic pigment or carbon black with an organic polymer or the like. More specifically, the disadvantages are caused by the following two reasons: (1) The covering of the organic pigment or the carbon black with an organic polymer impairs color developability of the pigment, and (2) a residual matter remaining after the covering treatment lowers the surface tension of the ink to facilitate penetration of the organic pigment or carbon black of the ink into the interior of the printing medium.

The above two disadvantages can be overcome by lowering the degree of covering with the organic polymer. However, simple lowering of the covering degree may cause another problem that the organic pigment or carbon black are not sufficiently and finely dispersed in the ink medium. Because of the above problem, this method is not practical although the rub resistance can be improved with the image stability maintained without drop of the OD.

Further, for example, in color image printing with an ink set of inks of yellow, magenta, cyan, and so forth containing the microencapsulated organic pigment or carbon black, the color may run at the boundary between different colors, or the color inks may be mixed nonuniformly on the printing medium to lower the quality of the printed image. (This phenomenon is hereinafter called "bleeding".)

To prevent such bleeding, Japanese Patent Application Laid-Open No. 55-65269, etc. disclose addition of a surfactant to the ink to accelerate penetration of the ink into the printing medium, and Japanese Patent Application Laid-Open No. 55-66976 discloses use of a volatile solvent as the main constituent of the ink liquid medium. These techniques also may cause decrease of image density or make the ink ejection unstable.

Accordingly, the inventors of the present invention recognized the necessity of development of the ink which contains an organic pigment or carbon black having improved color developability in single use or in combination with another color ink, and which causes less variation of image quality independently of the kind of the printing medium.

An object of the present invention is to provide an ink which lessens the influence of the printing medium on the printed image quality, gives high-quality images steadily, and is stable by itself.

Another object of the present invention is to provide an ink which forms high-quality images steadily independent of the printing medium.

Another object of the present invention is to provide an ink set which can prevent bleeding, by use of the aforementioned aqueous ink.

A further object of the present invention is to provide an image formation apparatus, an image forming method, and devices including an ink cartridge and a printing unit for the apparatus for steady formation of high-quality images with less influence of the printing medium on the image quality.

A still further object of the present invention is to provide a coloring material which improves the color chroma and density of the printed image and is suitable for ink-jet printing.

According to one aspect of the present invention, there is provided an aqueous ink comprising a water insoluble coloring material encapsulated with an organic polymer, wherein the coloring material encapsulated with the organic polymer contains the organic polymer in an amount of from 1% to 20% by weight to the aforementioned water insoluble coloring material.

According to another aspect of the present invention, there is provided an aqueous ink comprising a coloring material encapsulated with an organic polymer, wherein a part of the coloring material's surface is substantially exposed.

The ink of still another embodiment of the present invention is an aqueous ink containing a capsuled coloring material constituted of a self-dispersible organic pigment or a self-dispersible carbon black as a coloring material, and an organic polymer covering the coloring material; the capsuled. coloring material containing the organic polymer at a content ranging from 1% to 20% by weight to said coloring material.

The ink of still another embodiment of the present invention is an aqueous ink containing a capsuled coloring material constituted of a self-dispersible organic pigment or a self-dispersible carbon black as a coloring material, and an organic polymer covering the coloring material; the coloring material being partly uncovered such as to be substantially exposed.

With the ink of the above embodiments excellent images can be formed with high rub resistance and high felt-pen resistance and with sufficient image density and color chroma.

The ink of still another embodiment of the present invention is an ink containing a capsuled coloring material constituted of a self-dispersible organic pigment or a self-dispersible carbon black as a coloring material, and an organic polymer covering the coloring material; the capsuled coloring material having an infrared absorption spectrum with a peak inherent to a surface functional group of the self-dispersible organic pigment or the self-dispersible carbon black.

The ink of still another embodiment of the present invention is an ink containing a capsuled coloring material constituted of a self-dispersible organic pigment or a self-dispersible carbon black as a coloring material, and an organic polymer covering the coloring material; the capsuled coloring material not giving a new absorption peak in infrared spectrum after removal of the resin.

With the ink of the above embodiments excellent images can be steadily formed with high rub resistance and high felt-pen resistance and with sufficient image density and color chroma.

To the above embodiments of the inks, there may be added effectively at least one salt selected from the group consisting of $(M_2)_2SO_4$, $CH_3COO(M_2)$, $Ph—COO(M_2)$, $(M_2)NO_3$, $(M_2)Cl$, $(M_2)Br$, $(M_2)I$, $(M_2)_2SO_3$, and $(M_2)_2CO_3$, where $M_2$ is an alkali metal, ammonium, or an organic ammonium, and Ph is a phenyl group. The addition of the above salt can accelerate the separation of the coloring material (solid) and the aqueous medium (liquid) after adhesion of the ink onto a printing medium, thereby improving further the image density and color chroma.

The ink set for color printing of an embodiment of the present invention comprises inks of a black ink, a yellow ink, a magenta ink, and a cyan ink, wherein at least one of the inks is the ink described above.

With the ink set of the above embodiments excellent image can be steadily formed with high rub resistance and high felt-pen resistance and with sufficient image density and color chroma. To the ink of the above ink set, there may be added effectively at least one salt selected from the group consisting of $(M_2)_2SO_4$, $CH_3COO(M_2)$, $Ph—COO(M_2)$, $(M_2)NO_3$, $(M_2)Cl$, $(M_2)Br$, $(M_2)I$, $(M_2)_2SO_3$, and $(M_2)_2CO_3$, where $M_2$ is an alkali metal, ammonium, or an organic ammonium, and Ph is a phenyl group. The addition of the above salt will accelerate the separation of the coloring material (solid) and the aqueous medium (liquid) after adhesion of the ink onto a printing medium, thereby improving further the image density and color chroma, and retarding the bleeding.

The ink cartridge of an embodiment of the present invention comprises an ink tank holding any of the above-mentioned inks.

The printing unit of an embodiment of the present invention has a holder for holding any of the above-mentioned inks, and a head for ejecting the ink.

The ink-jet printing method of an embodiment of the present invention comprises a step of flying any of the above-mentioned inks toward a printing medium surface and attaching the ink onto the printing medium surface.

The capsuled coloring material of an embodiment of the present invention is constituted of a self-dispersible organic pigment or a self-dispersible carbon black as a coloring material, and an organic polymer covering the coloring material; the capsuled coloring material having an infrared absorption spectrum having a peak inherent to a surface functional group of the self-dispersible organic pigment or the self-dispersible carbon black.

The capsuled coloring material of another embodiment of the present invention is constituted of a self-dispersible organic pigment or a self-dispersible carbon black as a coloring material, and an organic polymer covering the coloring material; the capsuled coloring material not giving a new absorption peak in infrared spectrum after removal of the covering of organic polymer.

DETAILED DESCRIPTION OF THE PREFERRED EMBODIMENTS

Figure 1:
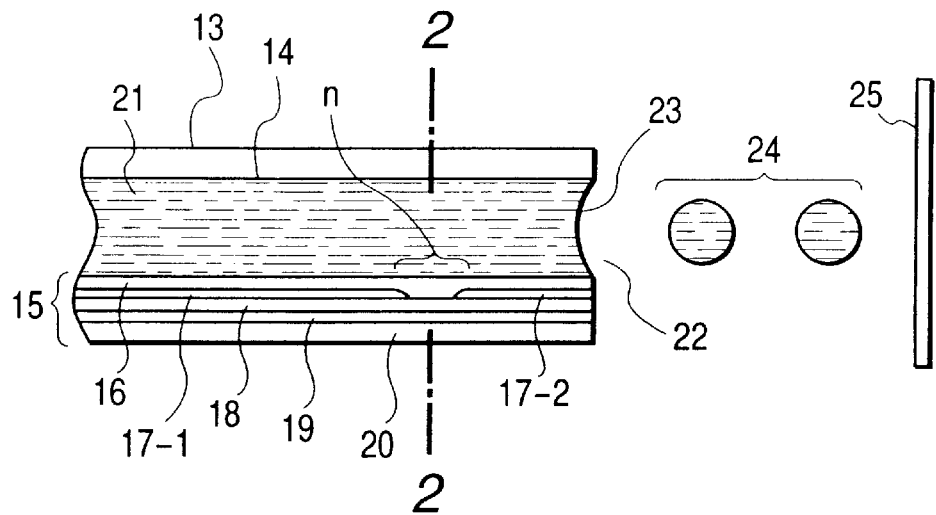
FIG. 1 is a vertical sectional view of an embodiment of a head of an ink-jet printing apparatus.

The preferred embodiments of the present invention are described below in detail.

The ink of the present invention is an aqueous ink containing a water-insoluble coloring material encapsulated with an organic polymer, the organic polymer being contained in an amount of from 1% to 20% by weight to the water-insoluble coloring material. In particular, the ink of the present invention is an aqueous ink containing a self-dispersible organic pigment or self-dispersible carbon black encapsulated with an organic polymer, the organic polymer being contained in an amount of from 1% to 20% by weight to the water-insoluble coloring material. Another ink of the present invention is an aqueous ink containing a water-insoluble coloring material encapsulated with an organic polymer, a part of the coloring material's surface is substantially exposed.

The water-insoluble coloring material employed in the present invention includes organic pigments and carbon blacks. Usually, the water-insoluble coloring material is used in combination with a conventional dispersant. However, in the present invention, the organic pigment or the carbon black is made self-dispersible in a conventional manner to be used as a self-dispersible organic pigment or a self-dispersible carbon black without a dispersant in order to exhibit good dispersibility.

The organic pigment includes specifically insoluble azo pigments such as toluidine red, toluidine maroon, Hanza yellow, benzidine yellow, and pyrazolone red; soluble azo pigments such as lithol red, helio bordeaux, pigment scarlet, and permanent red 2B; derivatives of vat dyes such as alizarine, indanthrone, and thioindigo maroon; phthalocyanine pigments such as phthalocyanine blue, and phthalocyanine green; quinacridone pigments such a quinacridone red, and qunacridone magenta; perylene pigments such as perylene red, and perylene scarlet; isoindolinone pigments such as isoindolinone yellow, and isoindolinone orange; imidazolone pigments such as benzimidazolone yellow, benzimidazolone orange, and benzimidazolone red; pyranthrone pigments such as pyrenthrone red, and pyrenthrone orange; thioindigo pigments; condensed azo pigments; flaventhrone yellow; acylamide yellow; quinophthalone yellow; nickel azo yellow; copper azo methine yellow; perinone orange; anthrone orange; dianthraquinonyl red; and dioxazine violet.

The organic pigment includes those cited by Color Index No. (C.I.): C.I.Pigment Yellow 12, 13, 14, 17, 20, 24, 74, 83, 86, 93, 109, 110, 117, 120, 125, 137, 138, 147, 148, 151, 153, 154, 166, and 168; C.I. Pigment Orange 16, 36, 43, 51, 55, 59, and 61; C.I. Pigment Red 9, 48, 49, 52, 53, 57, 97, 122, 123, 149, 168, 175, 176, 177, 180, 192, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:4, 15:6, 22, 60, and 64; C.I. Pigment Green 7, and 36; and C.I. Pigment Brown 23, 25, and 26; and so forth. Naturally, other known organic pigments may be used.

The carbon black includes carbon black pigments such as furnace black, lamp black, acetylene black and channel black: specifically, Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (produced by Columbia Co.); Black Pearls L, Regal 400R, Regal 330R, Regal 660R, Mogul L, Monarch 700, Monarch 800,Monarch 880, Monarch 900, Monarch 1000, Monarch 1100, Monarch 1300, Monarch 1400, and Valcan XC-72R (produced by Cabot Co.); Color Black FW1, Color Black FW2, Color Black FW2V, Color Black FW18, Color Black FW200, Color Black S150, Color Black S160, Color Black S170,Printex 35,Printex U, Printex V, Printex 140U, Printex 140V, Special Black 6, Special black 5, Special Black 4A, and Special Black 4 (produced by Degussa Co.); and No.25, No.33, No.40, No.47, No.52, No.900, No.2300. MCF-88, MA600,MA7, MA8, and MA100 (produced by Mitsubishi Chemical Co.), but is not limited thereto. Other known carbon black may be used.

The self-dispersible pigment used in the present invention includes those which have at least one kind of hydrophilic groups bonded directly or with interposition of another atomic group to the surface of the aforementioned pigment particles. The hydrophilic group includes anion groups such as—$COOM_1$, —$SO_3M_1$, and —$PO_3H(M_1)_2$, (where $M_1$ is a hydrogen atom, an alkali metal, ammonium, or an organic ammonium).

The aforementioned hydrophilic group may be bonded directly to the surface of the organic pigment or carbon black, or may be bonded indirectly with interposition of different atomic group to the surface of the organic pigment or carbon black. Preferably, the aforementioned hydrophilic group is bonded with interposition of another atomic group to the surface of the organic pigment or the carbon black.

The specific examples of the atomic group for the interposition are linear or branched alkylene groups of 1—12 carbons, substituted or unsubstituted phenylene groups, and substituted or unsubstituted naphthylene groups. The substituent of the phenylene group and naphthylene group includes alkyl groups (e.g., methyl). The combination of the interposing atomic group and the hydrophilic group is exemplified specifically by —$C_2H_4$—$COOM_1$, —Ph—$SO_3M_1$, —Ph—$COOM_1$ (Ph is a phenyl group). The carbon blacks and the organic pigments having a group of —$COOM_1$ or —$SO_3M_1$ as the anion is particularly preferred since they have high dispersibility in the aqueous medium constituting an ink.

The aforementioned alkali metal represented by $M_1$ includes Li, Na, K, Rb, and Cs. The organic ammonium includes methylammonium, dimethylammonium, trimethyammonium, ethylammonium, diethylammonium, triethylammonium, ethanolammonium, diethanolammonium, and triethanolammonium.

A preferred method for making the pigment self-dispersible, for example a carbon black, is oxidation treatment of the carbon black with sodium hypochlorite to introduce —COONa onto the surface of the carbon black.

The microencapsulation of the water-insoluble coloring material like the self-dispersible organic pigment or the carbon black by covering with an organic polymer can be conducted by any conventional method. The conventional method includes chemical methods, physical methods, physicochemical methods, and mechanical methods. The specific methods are shown below.

Interfacial polymerization:
Two kinds of monomers or two kinds of reactants are dissolved separately in a dispersion phase and a continuous phase, and are allowed to react at the interface of the two phases to form a wall membrane;

In-situ polymerization:
a gaseous or liquid monomer and a catalyst, or two kinds of reactive substances are fed from either one of the continuous phase and the nuclear particles to cause reaction to form a wall membrane;

In-solution film hardening:
Drops in a high polymer solution containing core material particles are hardened by a hardener or the like in the solution to form a wall membrane;

Coacervation (phase separation):
A high polymer liquid dispersion containing core substance particles dispersed therein is separated into a concentrated phase of a high polymer concentration and a diluted phase to form a wall membrane;

In-liquid drying:
Core substance is dispersed in a solution of a wall membrane material, this liquid dispersion is introduced into a liquid in which the continuous phase of the liquid dispersion is not miscible to form a composite emulsion, and the medium of the wall material solution is removed gradually to form a wall membrane;

Melt-dispersion cooling:
A wall substance material which can be melted by heating and solidified by cooling is liquified by heating, a core substance particles are dispersed therein in a form of fine particles, and the dispersion is cooled in a form of fine particles to form a wall membrane;

In-gas suspension covering:
A core substance particle powder is suspended in a gas by fluidized bed, and a covering liquid as the wall substance is sprayed and mixed to form a wall membrane;

Spray drying:
An encapsulating solution is sprayed into a hot gas stream to evaporate a volatile mater to form a wall membrane;

Acid deposition:
An organic polymer containing an anionic group is made water-soluble by neutralizing at least a part of the anionic group with a basic compound, and mixed with a coloring material in an aqueous medium, and the mixture is neutralized or acidified to deposit with an acidic compound and fix the organic compound onto the coloring material, and the coloring material is neutralized and dispersed; Emulsion phase reversal:
A water-dispersible anionic organic polymer and a coloring material are dispersed in an organic solvent phase, and water is added to the organic solvent phase, or the organic phase is added to water.

The organic polymer material for the wall membrane of the microcapsule includes polyamides, polyurethanes, polyesters, polyureas, epoxy resins, polycarbonates, urea resins, melamine resins, phenol resins, silicone resins, polysaccharides, gelatin, gum arabia, dextran, casein, proteins, natural rubber, carboxy polymethylene, polyvinyl alcohols, polyvinylpyrrolidones, polyvinyl acetates, polyvinyl chlorides, polyvinylidene chlorides, cellulose, ethycellulose, methycelluloe, nitrocellulose, hydroxyethylcellulose, cellulose acetates, polyethylenes, polystyrenes, (meth)acrylic acid polymers and copolymers, (meth)acrylate ester polymers and copolymers, (meth)acrylic acid/(meth)acrylate ester copolymers, styrene/(meth)acrylic acid copolymer, styrene/maleic acid copolymers, sodium alginates, fatty acids, paraffin, beeswax, privet wax, hardened tallow, carnauba wax and albumins. The organic polymer material may contain an anionic group such as a carbonic acid group or a sulfonic group. The nonionic organic polymer includes polyvinyl alcohols, polyethylene glycol monomethacrylates, polypropylene glycol monomethacrylates, methoxypolyethylene glycol monomethacrylates, and cationic ring-opening polymerization products of 2-oxazoline. Of these, completely saponified polyvinyl alcohols are particularly preferred because of their low water-solubility, solubleness in hot water but insolubleness in cold water.

The organic polymer constituting the microcapsule wall substance is used in an amount ranging from 1% to 20% by weight based on the water-insoluble coloring material like an organic pigment or a carbon black. Within the above range of the amount of the organic polymer, drop of the color developability caused by covering of the pigment surface with the organic polymer can be prevented because the content of the organic polymer in the capsule is relatively low. With the organic polymer in an amount of less than 1% by weight, the effects of the encapsulation can hardly be achieved, whereas with the organic polymer in an amount of more than 20% by weight, the color development of the pigment is significantly lowered. Considering other properties, the amount of the organic polymer is used preferably in the range of from 5% to 10% by weight. In the preferred range, a portion of the coloring material is uncovered substantially to be exposed to keep the color developability, and the other portion is practically covered to achieve the effect of the covering of the pigment simultaneously. The organic polymer employed in the present invention has preferably a number average molecular weight of not less than 2000 from the standpoint of preparing the encapsulation. In the above description, the term "uncovered substantially" herein signifies the partially uncovered state, and not topically or locally uncovered state caused by a defect like a pinhole and cracking.

The self-dispersible organic pigment or the self-dispersible carbon black as the coloring material is preferred in the present invention since the coloring material will disperse sufficiently even at a lower content of the organic polymer in the capsule to obtain sufficient storage stability of the ink.

The organic polymer is selected to be suitable for the microencapsulation method employed. For the interfacial polymerization, the suitable organic polymer includes polyesters, polyamides, polyurethanes, polyvinylpyrolidones, epoxy resins. For the in-situ polymerization, the suitable organic polymer includes (meth)acrylate ester polymers or copolymers, (meth)acrylic acid/(meth)acrylate ester copolymers, styrene/(meth)acrylic acid copolymers, polyvinyl chlorides, polyvinylidene chlorides, and polyamides. For the in-solution film hardening, the suitable organic polymer includes sodium alginate, polyvinyl alcohols, gelatin, albumin, and epoxy resins. For coacervation, the suitable organic polymer includes gelatin, celluloses, and casein. For obtaining a fine and uniform microencapsulated pigment, naturally any known encapsulating method is applicable in addition to the above methods.

In the phase reversal or acid deposition for the microencapsulation, an anionic organic polymer is employed as the organic polymer constituting the wall film of the microcapsule. The phase reversal is a process in which a composite of the anionic organic polymer self-dispersible or soluble in water with a coloring material like a self-dispersible organic pigment or carbon black, or a mixture of a coloring material like a self-dispersible organic pigment or carbon black, a hardening agent, and the anionic organic polymer are mixed in an organic solvent phase; and water is put into the organic solvent phase or the organic solvent is put into water to cause self-dispersion (phase reversal emulsification) for microencapsulation. In the phase reversal method, a vehicle or an additive for the ink may be included in the organic solvent phase without problem. In particular, the ink liquid medium is preferably incorporated in view of direct production liquid dispersion for the ink.

The acid deposition for the microencapsulation comprises the steps of neutralizing a part or whole of the anionic groups of the anionic group-containing organic polymer with a basic compound; mixing it with a coloring material like a self-dispersible organic pigment or carbon black in an aqueous medium; neutralizing or acidifying the mixture to deposit and fix the anionic group-containing organic polymer onto the pigment to obtain a wet cake; and neutralizing a part or whole of the anionic groups in the wet cake by use of a basic compound to cause microencapsulation. Thereby, an aqueous dispersion is prepared which contains a fine anionic microencapsulated pigment in a larger amount.

The solvent for the aforementioned preparation of microcapsules includes alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform, and ethylene dichloride; ketones such as acetone, and methyl isobutyl ketone; ethers such as tetrahydrofuran, and dioxane; and cellosolves such as methylcellosolve, and butylcellosolve.

The microcapsules are separated once from the solvent by centrifugation or filtration. The separated microcapsules are re-dispersed by agitation with water and a necessary solvent to obtain the ink of the present invention. The pigment capsules obtained by the above method has an average particle diameter ranging preferably from 50 nm to 180 nm.

The constitution ratio of the organic polymer in the coloring matter of the present invention can be determined readily from the coloring material concentration and the nonvolatile matter concentration. The substantially uncovered state of a part of the coloring material can be examined as below. For example, if the pH dependency of the dispersion stability is not changed practically before and after the covering, some portions of the coloring material is considered to be uncovered and be exposed practically. In another way, the partial exposure can be judged by determining the surface functional group by volumetric titration. In still another way, the partial exposure of the water-insoluble coloring material can be confirmed by infrared (IR) absorption spectrum. This is described below in detail by reference to FIG. 28.

Figure 28:
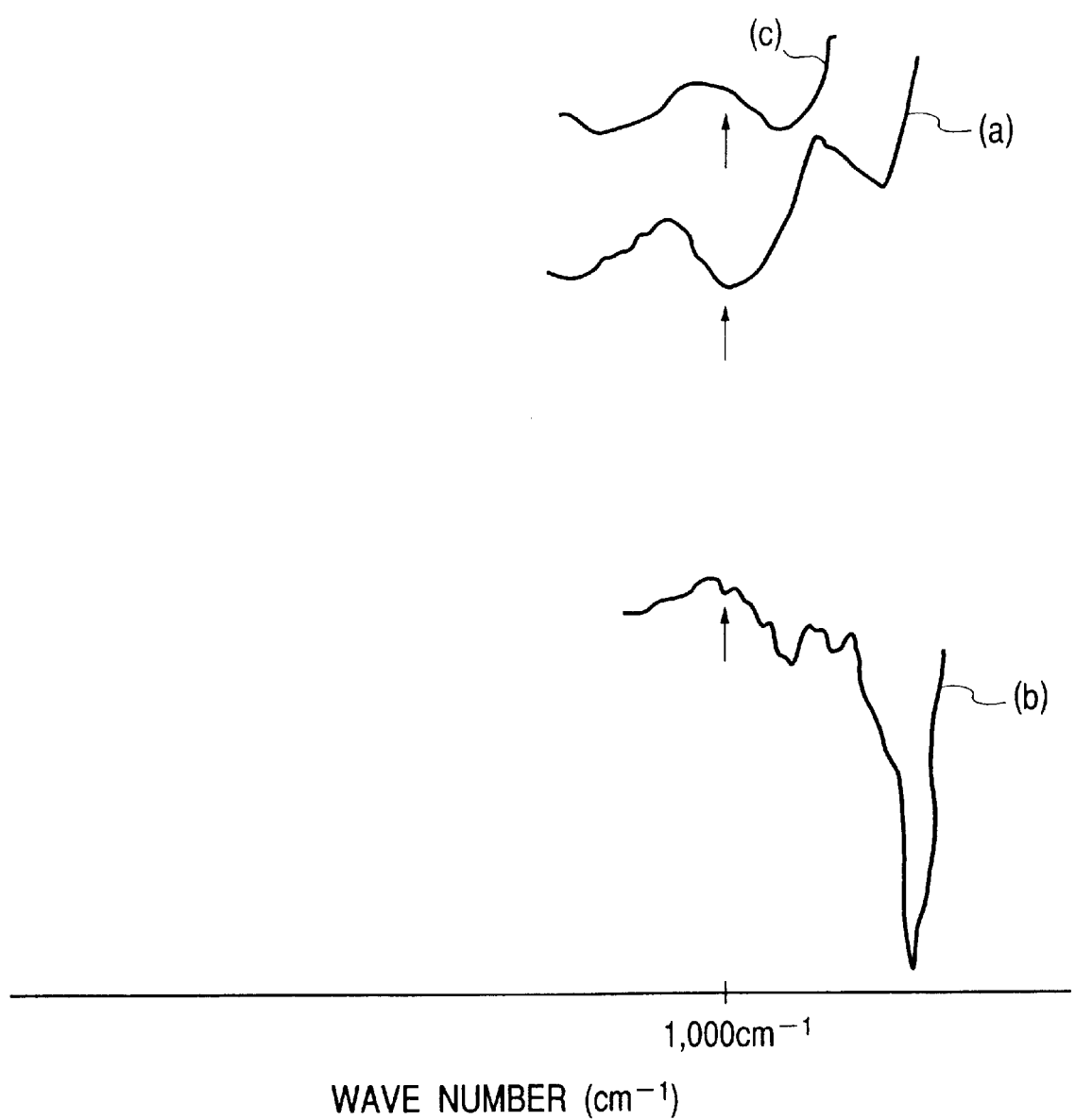
FIG. 28 is a chart showing a part of Fourier-transformed infrared absorption spectrum of three capsulated coloring materials of different organic polymer covering state.

In FIG. 28, the curve (a) is a part of the IR absorption spectrum of self-dispersible carbon black (CaboJet 300, Cabot Co.) not covered with an organic polymer. This self-dispersible carbon black has a carboxylic group as the surface functional group bonded with interposition of a phenylene group to the surface. The absorption peak of (a) is characteristic to the surface functional group of the self-dispersible carbon black. The absorption peak of (b) is a part of the IR absorption spectrum of capsulated coloring material constituted of the self-dispersible carbon black and a covering organic polymer in a ratio of 20% by weight based on the coloring material. The absorption peak of (c) is a part of the IR absorption spectrum of capsulated coloring material constituted of the self-dispersible carbon black and a covering organic polymer in a ratio of 40% by weight based on the capsulated coloring material. As is clear from the spectrum (b), the capsuled coloring material having the organic polymer in the ratio of 20% by weight shows the absorption peak inherent to the surface functional group of the self-dispersible carbon black although the absorption intensity is low, whereas the spectrum (c) of the capsuled coloring material shows no inherent absorption peak. This shows that the capsuled coloring material having the covering organic polymer at a ratio of 20% by weight of the coloring material has a part of the surface of the carbon black exposed without covering by the organic polymer, and that the surface of the capsuled coloring material having the covering organic polymer at a ratio of 40% by weight of the coloring material is completely covered.

In other words, the capsulated coloring material of the present invention gives no new IR spectrum peak by removal of the covering organic polymer by means of solvent, which is a characteristic of the present invention.

For prevention of decrease of color developability of the pigment and effective prevention of bleeding at the boundary between different colors in color image formation with two or more color inks, there is added at least one of the compounds selected from $(M_2)_2SO_4$, $CH_3COO(M_2)$, Ph—$COO(M_2)$, $(M_2)NO_3$, $(M_2)Cl$, $(M_2)Br$, $(M_2)I$, $(M_2)_2SO_3$, and $(M_2)_2CO_3$, where $M_2$ is the same as the aforementioned $M_1$, and Ph is a phenyl.

Of the above salts, the sulfate salts (e.g., potassium sulfate) and the benzoate salt (e.g., ammonium benzoate) are preferred since the aforementioned ink properties, for example, ink ejection properties of ink-jet ink are less adversely affected. The content of the above salt in the ink ranges preferably from 0.05% to 10% by weight, more preferably from 0.1% to 5% by weight for obtaining an image of the high density, high color development and high quality of the image. By coexistence of the above specified salt, the ink containing the capsuled coloring materials constituted of the self-dispersible organic pigment or carbon black and the organic polymer is capable of forming steadily high-quality images without significant influence of a printing medium on image density and color developability and image quality.

The mechanism of exhibiting the above properties of the ink is not clarified at the moment. However, the inventors of the present invention found that the Ka value of Bristow, which is a measure of penetrativity of an ink into a printing medium, of the ink of the present invention containing the above salt is higher than the one not containing the salt. The increase of the Ka value shows increase of penetrativity of the ink into the printing medium. The increase of the ink penetrativity will lower the image density, which is common sense for a person skilled in the art. With the penetration of the ink, the coloring material will also penetrate into the interior of the printing medium, resulting in drop of the image density on the surface.

From such knowledge collectively, the above specified salt contained in the ink of the present invention is considered to cause quick separation of the liquid medium and the solid matter (solid-liquid separation) in the ink after application onto a printing medium (e.g., paper sheet) specifically. In other words, on application of the ink onto a printing medium, if the rate of the solid-liquid separation is lower, as to the ink having high Ka value, on the printing medium having high ink penetration property, the ink together with the coloring material can diffuse isotropically in the printing medium, impairing the sharpness (print quality) of the characters and lowering the image density owing to the penetration of the ink into the deep interior of the printing medium.

However, the ink of the present invention, especially the ink containing the above salt, does not cause the above phenomenon, suggesting quick solid-liquid separation of the ink on application onto the printing medium to give images of high density, high color developability, and high quality in spite of the high Ka value of the ink. Even with printing medium of a relatively high permeability, the ink of the present invention is less liable to cause deterioration of character quality or of the image density. This is also considered to be due to the above reason. This is explained further by reference to FIGS. 10A to 10C and FIGS. 11A to 11C.

FIGS. 10A to 1C and FIGS. 11A to 11C show respectively the process of the solid-liquid separation of the ink containing and not-containing the above specified salt and ejected by an ink-jet printing system onto a highly permeable printing medium, schematically and conceptionally.

Figure 10A:
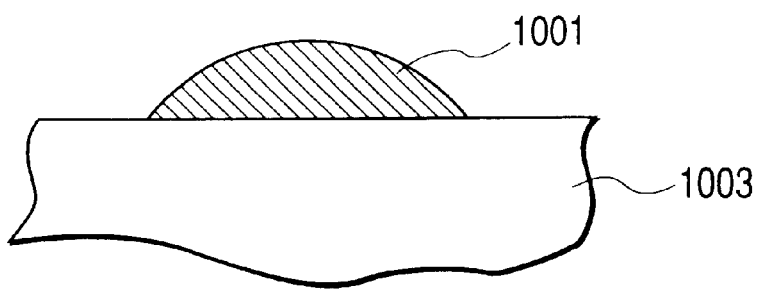
FIGS. 10A, 10B and 10C are schematic drawings illustrating a process of solid-liquid separation on application onto a printing medium of a salt-containing pigment ink.
Figure 10B:
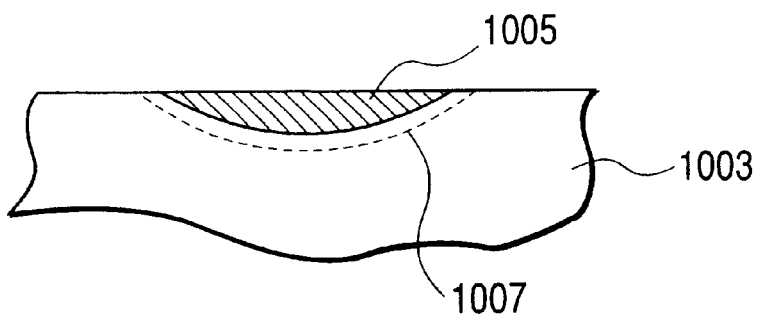
Figure 10C:
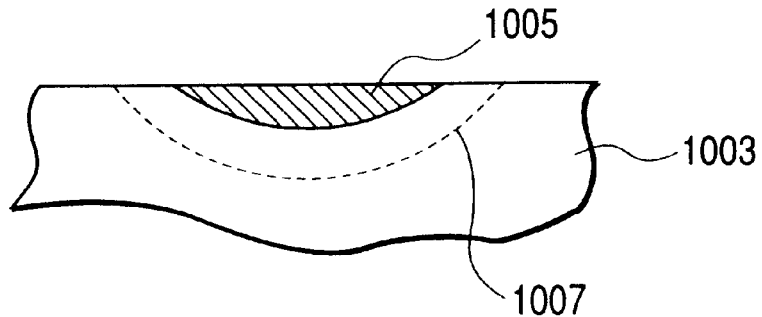
Figure 11A:
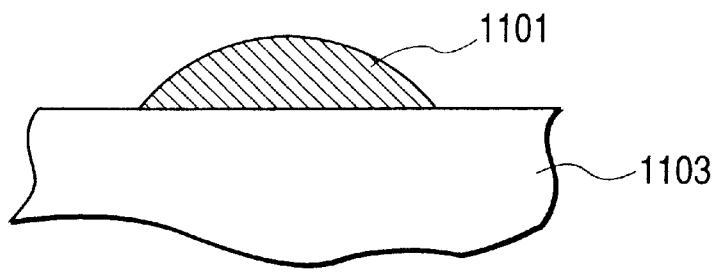
FIGS. 11A, 11B and 11C are schematic drawings illustrating a process of solid-liquid separation on application onto a printing medium of a pigment ink not containing a salt.
Figure 11B:
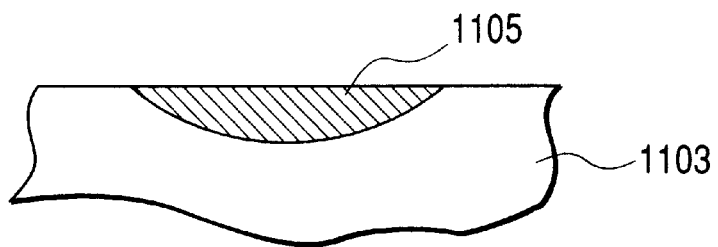
Figure 11C:
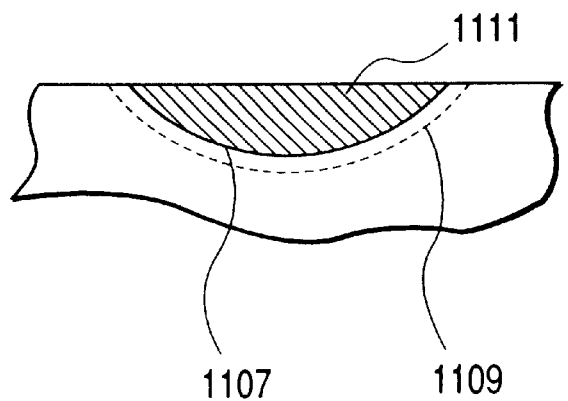

Immediately after landing of an ink droplet, as shown in FIG. 10A and FIG. 11B, the droplet of the ink 1001 or 1101 is laid on the surface of the printing medium independently of the presence of the salt. After time $T_1$, the ink 1001 containing the salt causes quick solid-liquid separation as shown in FIG. 10B into a region 1005 containing most of the solid component in the ink and the liquid medium of the ink, and the penetration front end 1007 of the separated liquid medium penetrates into the interior of the printing medium 1003. On the other hand, as shown in FIG. 11B, the ink 1101 not containing the salt does not cause the solid-liquid separation so quickly as the salt-containing ink, so that the ink in an unseparated state 1105 penetrates into the interior of the printing medium 1103. After time $T_2$, with the ink 1001 containing the salt, the penetration front end 1007 further penetrates into the interior of the paper as shown in FIG. 10C with the region 1005 retained at and near the surface. In contrast, the ink 1101 not containing the salt begins to cause solid-liquid separation at this moment as shown in FIG. 11C to differentiate the penetration front 1107 of the solid matter of the ink from the penetration front end 1109 of the liquid medium with the solid containing region 1111 of the ink reaching the depth of the interior of the printing medium. Incidentally, the times $T_1$ and $T_2$ are respectively a measure of time for conceptional explanation of the effect of the salt in the solid-liquid separation.

As explained above, it is considered that the specified salt added to the ink causes quick solid-liquid separation of the ink after landing of the ink droplet on the printing medium surface in the early stage to allow the coloring material like a pigment to remain on the surface and to allow the liquid medium to penetrate into the interior, thereby achieving the aforementioned effect. In other words, the addition of the specified salt to the ink offsets the influence of the permeability of the printing medium on the density and quality of the image formed. Of the aforementioned specific salts, as described above, sulfate salts (e.g., potassium sulfate) and benzoate salts (e.g., ammonium benzoate) are highly compatible with the capsuled pigment formed by covering an organic pigment or carbon black with an organic polymer, achieving efficient solid-liquid separation on application onto the printing medium and enabling formation of high-quality image on various printing mediums.

The aqueous medium for the ink of the present invention is described below. The aqueous medium includes water, and mixed solvents of water with a water-soluble organic solvent. The water is preferably deionized water. The water-soluble organic solvent is preferably has an effect of ink drying prevention. The water-soluble organic solvent includes specifically alkyl alcohols of 1–4 carbons such as methyl alcohol, ethyl alcohol, n-propyl alcohol, isopropyl alcohol, n-butyl alcohol, s-butyl alcohol, and t-butyl alcohol; amides such as dimethylformamide, and dimethyl acetamide; ketones and ketoalcohols such as acetone, and diacetone alcohol; ethers such as tetrahydrofuran, and dioxane; polyalkylene glycols such as polyethylene glycol, and polypropylene glycol; polyols having alkylene of 2–6 carbons such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; lower alkyl ethers of a polyhydric alcohol such as ethylene glycol monomethyl (or monoethyl) ether, diethylene glycol methyl (or ethyl) ether, and triethylene glycol monomethyl (or monoethyl) ether; polyhydric alcohols such as trimethylolpropane, and trimethylolethane; N-methyl-2-pyrrolidone, 2-pyrrolidone, and 1,3-dimethyl-2-imidazolidinone, and so forth. The aqueous organic solvents as mentioned above may be used solely or a mixture of two or more thereof.

The content of the water-soluble organic solvent in the ink of the present invention is not specially limited, ranging preferably from 3% to 50% by weight based on the total weight of the ink. The content of water in the ink ranges preferably from 50% to 95% by weight based on the total weight of the ink. The essential components of the ink of the present invention are mentioned above. An additional agent may be used, such as a pH controller such as an alkalizing agent, a surfactant, an antiseptic agent, a viscosity controller, antioxidant, and the like.

The ink of the present invention is useful for writing utensils and ink-jet printing inks. The ink-jet printing system includes a printing system applying mechanical energy to the ink to eject ink-droplets and another printing system applying thermal energy to the ink to cause bubbling to eject ink droplets. The ink of the present invention is particularly suitable for both of the ink-jet printing systems.

For ink-jet printing, the ink of the present invention has preferably properties suitable for ejection through an ink-jet head. For ejection through the ink-jet head, the ink has a viscosity ranging preferably from 1 to 15 cp, more preferably from 1 to 5 cp; and a surface tension of preferably not lower than 25 mN/m (dyn/cm), more preferably ranging from 25 to 50 mN/m (dyn/cm).

A measure of the penetrativity of ink into a printing medium is the Ka value derived by the Bristow's method. The quantity V (mL/m$^2$ =$\mu$m) of the ink penetration in the printing medium at a time t after landing of the ink droplet is shown by Bristow's equation below:

$$V=V_r+Ka(t-t_w)^{1/2}$$

Immediately after landing of the ink droplet on the surface of the printing medium, most of the ink is held in the concaves (surface roughness) of the surface of the printing medium with little penetration into the interior of the printing medium. This time is defined as the contact time ($t_w$), and the amount of the ink held by the concaves of the printing medium is represented by $V_r$. After the contact time after the ink droplet landing, the ink penetration increases in proportion to the square root of the time after the contact, $(t-t_w)^{1/2}$. Ka is the proportional constant, corresponding to the penetration speed. This Ka value can be measured by a dynamic permeation tester for Bristow's method (trade name: dynamic permeation tester S, Toyo Seiki Seisakusho K.K.) or the like.

The ink of the present invention exhibits the Ka value preferably less than 1.5, more preferably in the range from 0.2 to 1.5 on improvement of image density, color developability and image quality. At the Ka value of less than 1.5, the ink of the present invention will cause solid-liquid separation at the early stage of penetration into the printing medium to form high-quality images with high image density with little feathering.

The Bristow's Ka value is measured in the present invention with a plain paper sheet (e.g., PB paper supplied by Canon K.K. for use for electrophotographic copying machines, page printers (laser beam printers), and ink-jet printing type printers; and PPC paper for electrophotographic copying machines). The measurement is conducted under ordinary office environmental conditions: for example, temperature 20 to 25° C., and relative humidity 40 to 60%.

The suitable aqueous medium for giving the above desirable properties to the ink of the present invention contains preferably glycerin, trimethylolpropane, thiodiglycol, ethylene glycol, diethylene glycol, isopropyl alcohol, acetylene alcohol, or the like. In particular, the Ka value of less than 1.5 can be achieved by adding further a surfactant such as acetylene glycol ethylene oxide adduct (trade name: Acetylenol, by Kawaken Fine Chemical K.K.), a penetrative solvent, or the like.

The ink set of the present invention is an ink set for color printing having inks of black, yellow, magenta, and cyan, in which at least one ink is the aforementioned ink of the present invention, containing preferably the aforementioned salt. In color printing with such an ink set, bleeding is effectively prevented. The reason is not clear why the bleeding is effectively prevented. Presumably, coexistence of the salt with the aqueous ink containing the capsuled pigment containing a water-insoluble coloring material such as self-dispersible organic pigment and carbon black covered with an organic polymer will accelerate the solid-liquid separation after attaching to the printing medium and subsequent solidification of the coloring material, preventing the bleeding of the ink into the adjacent different color region at the boundary between the printed colors. The above effect can be achieved provided that the salt is contained in any one of the adjacent color inks. Naturally, the salt may be contained in all of the color inks to achieve the above effects.

As mentioned above, any known dye or pigment may be added to the ink as necessary for adjusting the color tone. This is included in the present invention. The dye includes acid dyes, direct dyes, reactive dyes, and food dyes. Anionic dyes, known or newly synthesized, are generally useful, provided that the dye gives suitable color tone and color density. The dyes may be used as a mixture of two or more thereof. Specific examples of the anionic dyes are enumerated below.

(Yellow Dyes)
C.I. Direct Yellow 8, 11, 12, 27, 28, 33, 39, 44, 50, 58, 85, 86, 87, 88, 89, 98, 100, 110, and 132; C.I. Acid Yellow 1, 3, 7, 11, 17, 23, 25, 29, 36, 38, 40, 42, 44, 76, 98, and 99; C.I. Reactive Yellow 2, 3, 17, 25, 37, and 42; C.I. Food Yellow 3; and so forth.

(Red Dyes)
C.I. Direct Red 2, 4, 9, 11, 20, 23, 24, 31, 39, 46, 62, 75, 79, 80, 83, 89, 95, 197, 201, 218, 220, 224, 225, 226, 227, 228, and 229; C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, and 289; C.I. Reactive Red 7, 12, 13, 15, 17, 20, 23, 24, 31, 42, 45, 46, and 59; C.I. Food Red 87, 92, and 94; and so forth.

(Blue Dyes)
C.I. Direct Blue 1, 15, 22, 25, 41, 76, 77, 80, 86, 90, 98, 106, 108, 120, 158, 163, 168, 199, and 226; C.I. Acid Blue 1, 7, 9, 15, 22, 23, 25, 29, 40, 43, 59, 62, 74, 78, 80, 90, 100, 102, 104, 117, 127, 138, 158, and 161; C.I. Reactive Blue 4, 5, 7, 13, 14, 15, 18, 19, 21, 26, 27, 29, 32, 38, 40, 44, and 100; and so forth.

(Black dyes)
C.I. Acid Black 2, 4, 8, 51, 52, 110, 115, and 156;
C.I. Food Black 1, and 2; and so forth.

Next, the ink-jet printing technique for using suitably the ink of the present invention is explained below. An example of constitution of the head, the main portion of ink ejecting means employing thermal energy, is shown in FIGS. 1 and 2.

Figure 2:
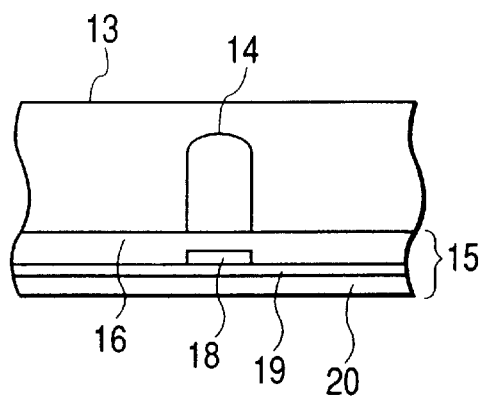
FIG. 2 is a sectional view taken along line 2—2 in FIG. 1.

FIG. 1 is a sectional view of a head 13 along an ink flow path. FIG. 2 is a sectional view of the head taken along line A–B in FIG. 1. The head 13 is constructed by bonding a plate of glass, ceramics, silicon, plastics, or the like having a flow path (nozzle) 14 for ink flow with a heater element substrate 15. The heater element substrate 15 is constituted of a protection layer 16 formed from silicon oxide, silicon nitride, silicon carbide, or the like; electrodes 17-1, 17-2 formed from aluminum, gold, an aluminum-copper alloy, or the like; a heating resistor layer 18 formed from a high melting material such as $HfB_2$, TaN, and TaAl; a heat-accumulating layer 19 formed from thermally oxidized silicon, aluminum oxide, or the like; and a substrate 20 made of a heat-radiating material such as silicon, aluminum, and aluminum nitride.

On application of electric signal information to the electrodes 17-1, 17-2 of the head 13, the region denoted by a symbol "n" on the heater element substrate head 15 generates heat abruptly to form bubbles in the ink on the surface of the heater element substrate, the pressure of the bubbles pushes out the meniscus 23 to eject the ink 21 through the nozzle 14 and the ejection orifice 22 of the head 13 in a shape of droplets 24. The ejected ink droplet flies toward a printing medium 25.

Figure 3:
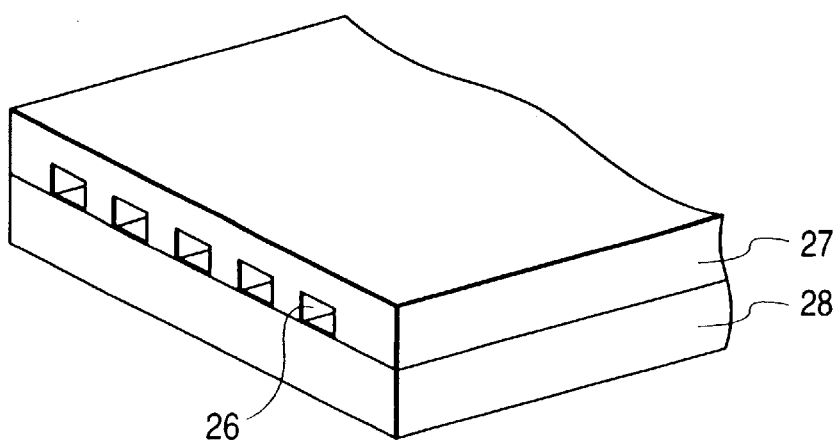
FIG. 3 is a schematic drawing for explaining a multi-head.

FIG. 3 shows an external appearance of a multi-head having juxtaposed plural heads shown in FIG. 1. The multi-head is formed by bonding a glass plate 27 having multi-nozzles 26 with a heat-generating head 28 like the one shown in FIG. 1.

Figure 4:
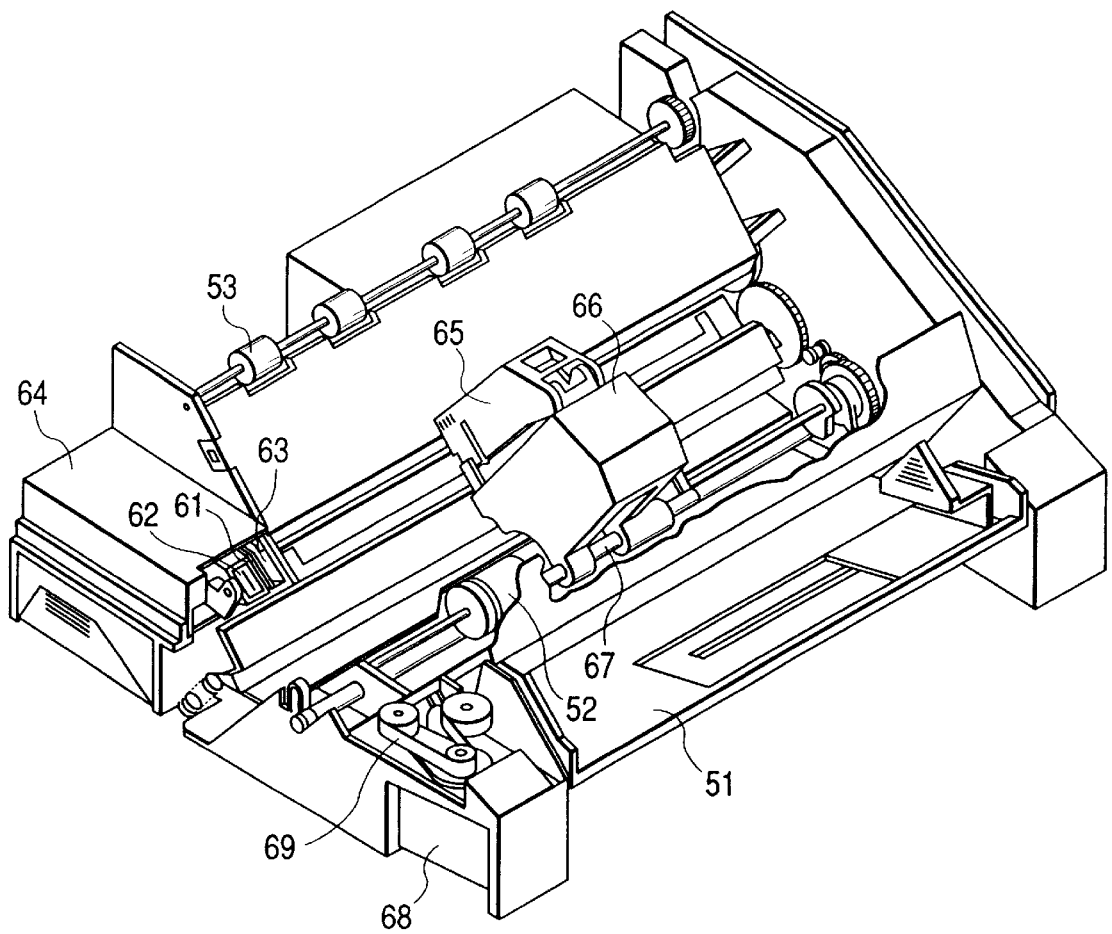
FIG. 4 is a schematic perspective view of an ink-jet printing apparatus.

FIG. 4 shows an example of the entire of the ink-jet printing apparatus equipped with such a head. In FIG. 4, a blade 61 as a wiping member is held at one end of the blade by a blade-holding member, forming a fixed end in a shape of a cantilever. The blade 61 is placed at a position adjacent to the printing region of the printing head 65, and, in this example, is held so as to protrude into the moving path of the printing head.

A cap 62 for capping the projected opening face is placed at a home position adjacent to the blade 61, and is constituted such that it moves in the direction perpendicular to the moving direction of the printing head 65 to come into contact with the ejection nozzle face to cap the nozzle. An ink absorbent 63 is placed at a position adjacent to the blade 61, and is held so as to protrude into the moving path of the printing head 65 in a manner similar to that of the blade 61. The blade 61, the cap 62, and the ink absorbent 63 constitute an ejection recovery device 64. The blade 61, and the ink absorbent 63 serve to remove water, dust, and the like from the face of the ink ejection nozzle.

A printing head 65 has an energy-generating means for the ejection, and conducts printing by ejecting the ink onto a printing medium opposing to the ejection nozzle face. A carriage 66 is provided for supporting and moving the printing head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the printing region of the printing head 65 and the adjacent region thereto. A paper sheet delivery device 51 for delivery of a printing medium and a paper sheet delivery roller 52 driven by a motor (not shown in the drawing) delivers a printing medium to the position opposing to the ejection nozzle face of the printing head.

With the above constitution, the printing medium is delivered with the progress of the printing, and is delivered further to a paper discharge device provided with paper sheet-discharging rollers 53 In the above constitution, when the printing head 65 returns to the home position on completion of printing, the cap 62 of the ejection-recovery device 64 is positioned out of the moving path of the printing head 65, and the blade 61 is allowed to protrude to the moving path. Thereby, the ejecting nozzle face of the printing head 65 is wiped.

To cap the ejection face of the printing head 65, the cap 62 protrudes toward the moving path of the printing head 65 to come into contact with the ejection nozzle face. When the printing head 65 is made to move from the home position to the record-starting position, the cap 62 and the blade 61 are at the same position as in the above-mentioned wiping step, so that the ejection nozzle face of the printing head 65 is wiped also in this movement.

The printing head 65 is moved to the home position not only at the completion of the printing and at the time of ejection recovery, but is also moved at a predetermined time interval during printing from the printing region. The nozzle is wiped by this movement.

Figure 5:
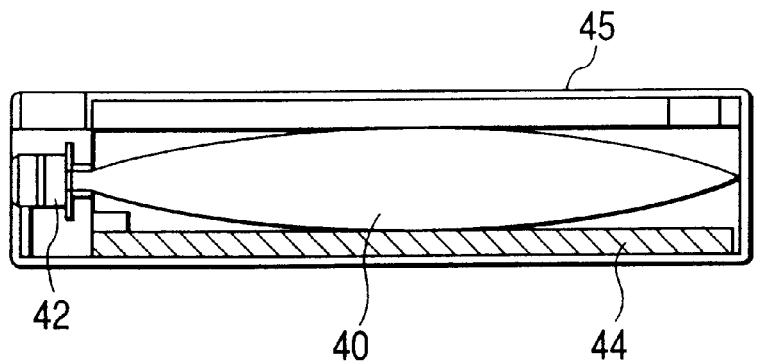
FIG. 5 is a vertical sectional view of an ink cartridge.

FIG. 5 is a sectional view of an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing) into the plug 42 enables supply of the ink from the ink bag 40 to the head. A waste-ink absorbent 44 serves to absorb waste ink. The liquid-contacting face of the ink container is preferably formed from polyolefin, especially polyethylene, in the present invention.

Figure 6:
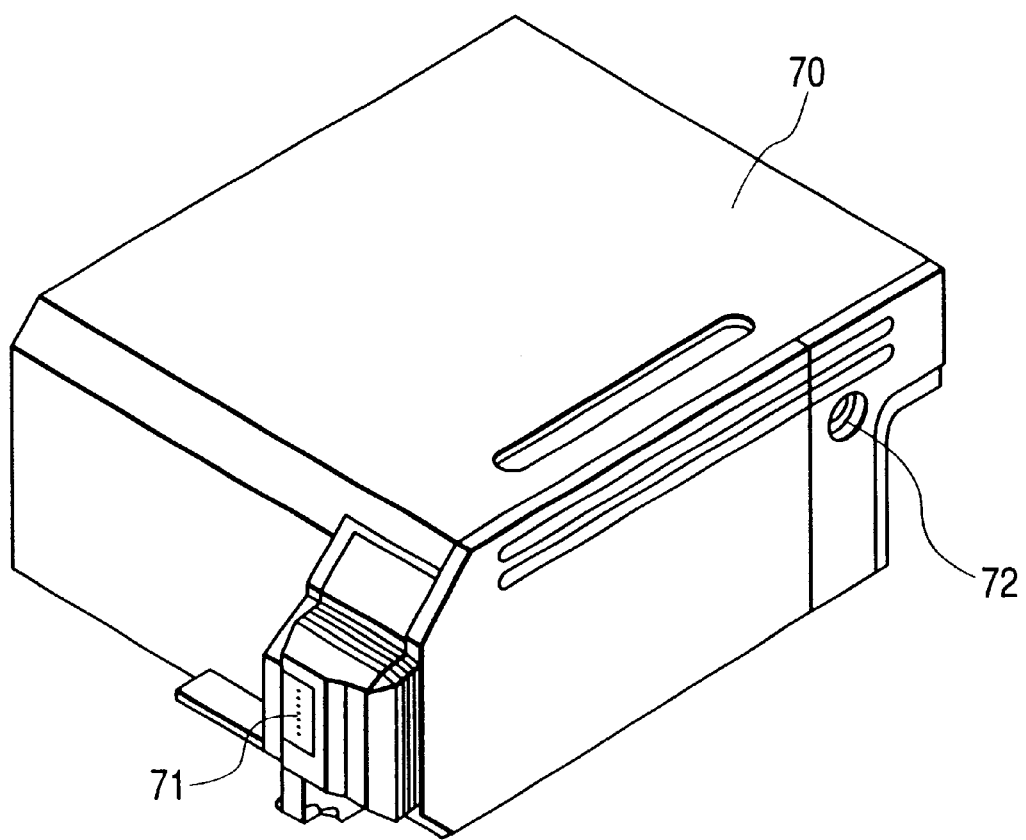
FIG. 6 is a perspective view of a printing unit.

The ink-jet printing apparatus used in the present invention is not limited to the above-mentioned one which has separately a head and an ink cartridge. Integration thereof as shown in FIG. 6 may suitably be employed. In FIG. 6, a printing unit 70 houses an ink holding member such as an ink absorbent, and the ink in the absorbent is ejected as an ink droplet from a plurality of orifices of a head 71 The ink absorbent is made preferably of polyurethane in the present invention.

The ink-holding member may be a structure of an ink bag having a spring inside without employing the ink absorbent. An air-communication opening 72 is provided for communication of the cartridge interior with the open air. The printing unit 70 may be used in place of the printing head 65 shown in FIG. 4, and is made to be mountable to and demountable from the carriage 66.

In another example of the ink-jet printing apparatus which utilizes a mechanical energy, an on-demand ink-jet printing head is employed. The on-demand ink-jet printing head comprises a nozzle-holding substrate having plural nozzles, and a pressure-generating element constituted of a piezoelectric material opposing to the nozzles and an electroconductive material, and is filled with an ink around the pressure-generating element. By application of a voltage, the pressure-generating element is displaced to eject the ink droplets through the nozzles.

Figure 7:
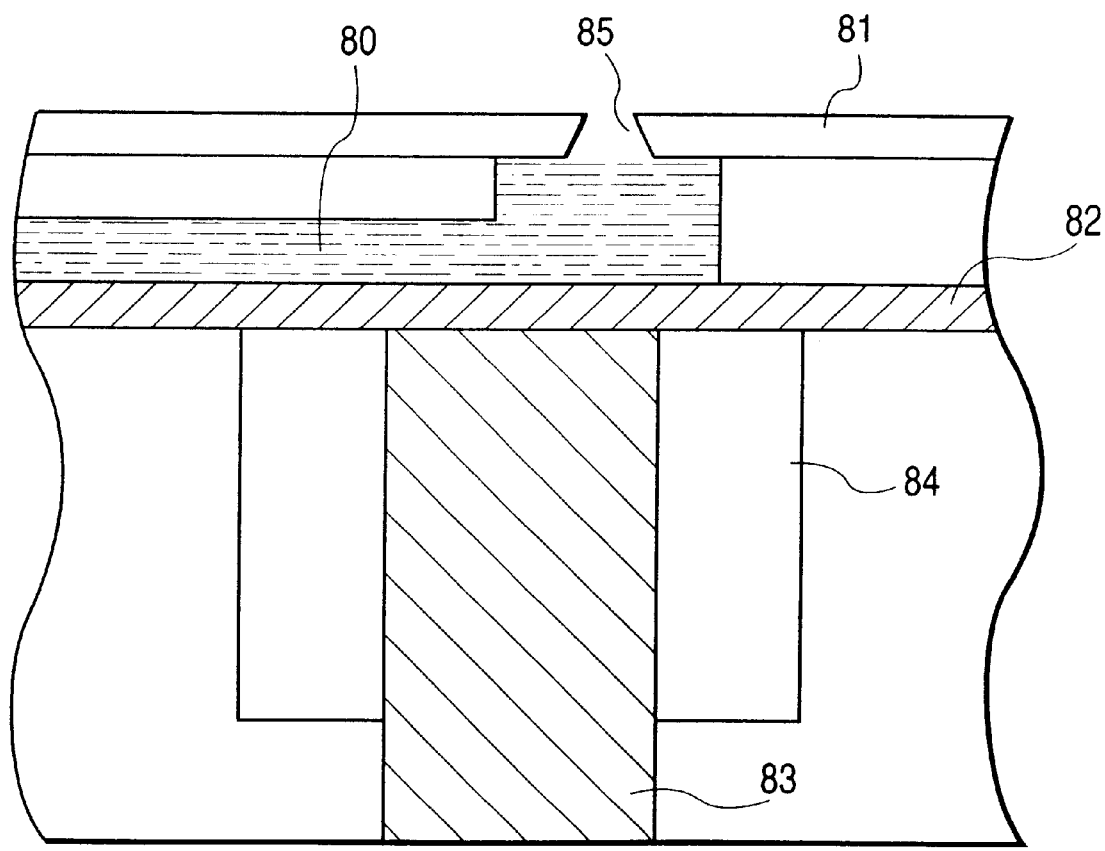
FIG. 7 is a schematic perspective view illustrating another constitution of an ink-jet printing head.

FIG. 7 shows an example of the constitution of the printing head which is the main portion of the printing apparatus. This head is constituted of an ink flow path 80 communicating with an ink chamber (not shown in the drawing), an orifice plate 81 for ejecting a prescribed volume of the ink droplets, a vibration plate 82 for exerting pressure directly to the ink, a piezo-electric element 83 joined to the vibration plate 82 and being displaced in response to electric signals, and a substrate 84 for fixing the orifice plate 81, the vibration plate 82, and so forth.

In FIG. 7, the ink flow path 80 is formed from a photosensitive resin, or a like material. An ejection orifice 85 is formed through the orifice plate 81, which is made of a metal such as stainless steel, and nickel, by boring by electrocasting or press working, or like processing. The vibration plate 82 is formed from a film of a metal such as stainless steel, nickel, and titanium, or a film of high-elasticity resin. The piezo-electric element 83 is made from a dielectric material such as barium titanate, and PZT.

In the printing head of the above constitution, pulsed voltage is applied to the piezo-electric element 83 to cause deformation stress therein to deform the vibration plate 82 joined to the piezo-electric element 83, whereby the ink in the ink flow path 80 is pressurized vertically to eject ink droplets (not shown in the drawing) through an ejection orifice 85 of the orifice plate 81 to conduct printing. Such a printing head can be used by incorporation into a printing apparatus similar to that shown in FIG. 4. The printing apparatus with such a printing head may be driven in the same manner as described before.

Figure 8:
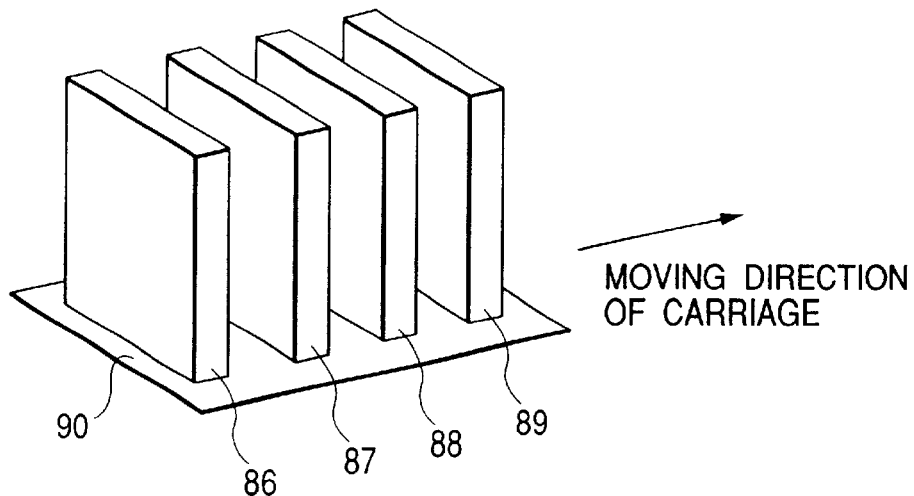
FIG. 8 is a schematic drawing of a printing head employing four ink cartridges.
Figure 9:
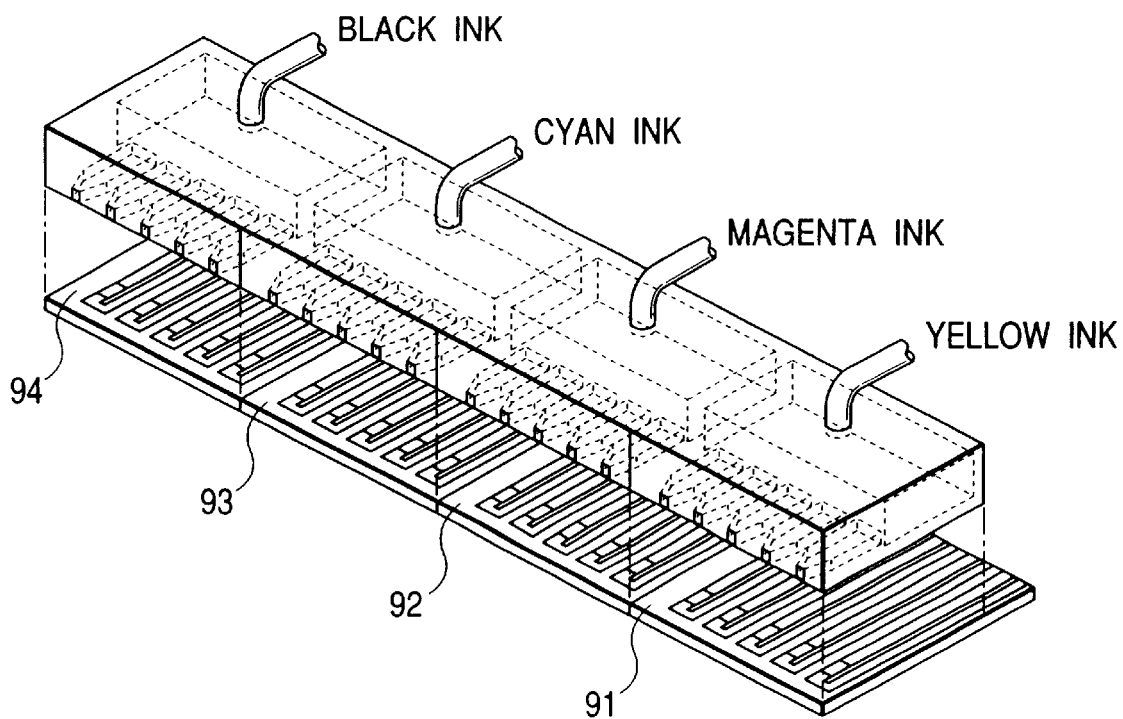
FIG. 9 is a schematic drawing of the constitution in which four printing heads are juxtaposed on a carriage.

In printing of a color image by means of a color printing ink set holding inks of black, cyan, magenta, and yellow of the present invention, a printing head 90 can be used which has four multi-printing heads on a carriage as shown in FIG. 3. FIG. 9 shows an example. The four printing units 91, 92, 93, 94 are placed on a carriage of the aforementioned printing apparatus, and eject the respective color, yellow, magenta, cyan, and black, inks in accordance with printing signals. The example shown by FIG. 9 employs four printing units. However, the present invention is not limited thereto. For example, as shown in FIG. 8, the printing is conducted by use of a printing head which has separate ink flow paths provided for ejecting the respective colors of the ink supplied from the ink cartridges 86, 87, 88, and 89.

Another example of the printing apparatus and the printing head suitable for the present invention are described below.

Figure 12:
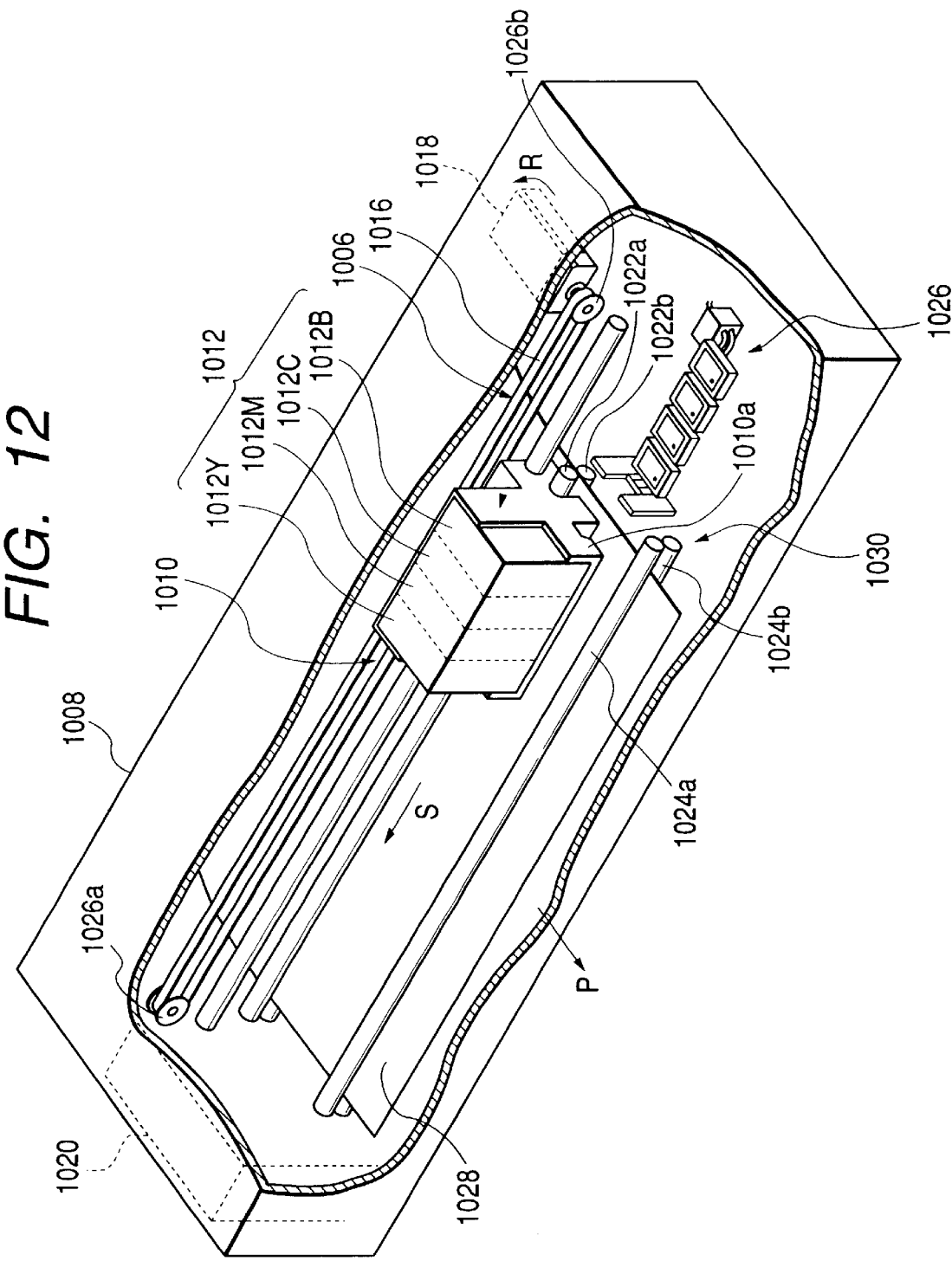
FIG. 12 is a schematic perspective view illustrating the main portion of an ink-jet printer for mounting a liquid ejecting head.

FIG. 12 is a schematic perspective view illustrating the main portion of an ink-jet printer employing a liquid ejecting head of the present invention, in which the bubble is communicated with the open air on ink ejection.

In FIG. 12, the ink-jet printer comprises a delivery device 1030, a printing device 1010, and a movement-driving device 1006. The delivery device 1030 is placed in a length direction in a casing 1008 to deliver the paper sheet 1028 as the printing medium intermittently in a direction of the arrow P. The printing device 1010 is driven reciprocatingly in a direction S perpendicular to the paper sheet delivery direction. The movement driving mechanism 1006 is a driving means for moving reciprocatingly the printing device 1010.

The driving mechanism 1006 comprises pulleys 1026a and 1026b set on a rotation axis opposed at a prescribed distance, a belt 1016 wound to the pulleys, roller units 1022a and 1022b, a carriage member 1010a for the printing device 1010 placed in parallel to roller units 1022a and 1022b, and a motor 1018 for driving the belt 1016 connected to the carriage member 1010a in normal and reversed directions.

By turning the belt 1016 in the arrow R direction as shown in FIG. 12 by the motor 1018, the carriage member 1010a of the printing device 1010 is moved in the arrow S direction in a prescribed distance, whereas by turning the belt 1016 in direction reverse to the arrow R by the motor 1018, the carriage member 1010a of the printing device 1010 is moved in the direction reverse to the arrow S in a prescribed distance. At one end of the movement driving mechanism 1006, a recovery unit 1026 is provided at the home position of the carriage member 1010a in opposition to the ink ejection orifice arrangement to recover the ejection performance of the printing device 1010.

The printing device 1010 ,ink-jet cartridges 1012Y, 1012M, 1012C, and 1012B (hereinafter occasionally called simply "cartridge") are each demountable separately and independently from the carriage member 1010a for the respective colors: for example, yellow, magenta, cyan, and black.

Figure 13:
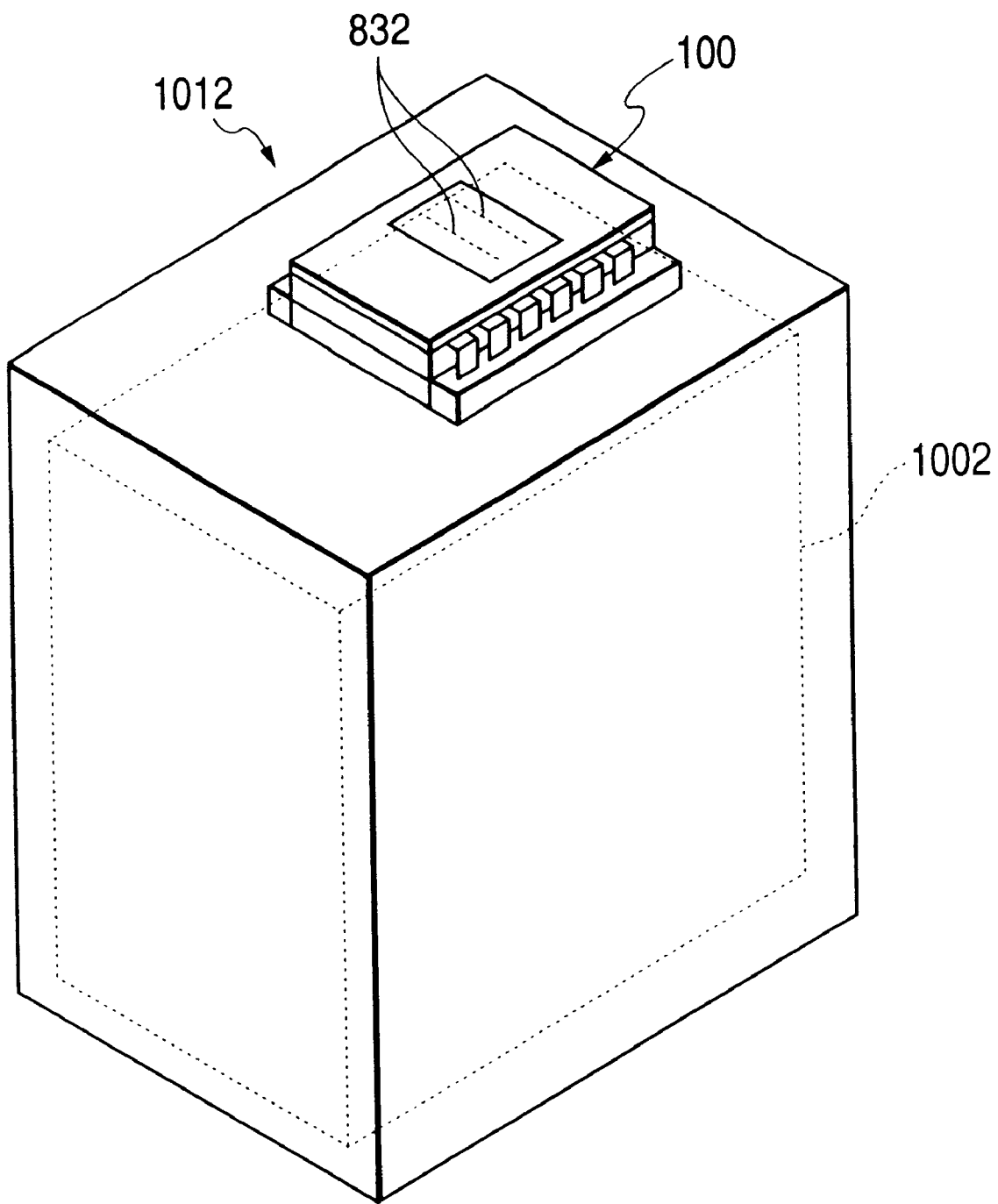
FIG. 13 is a schematic perspective view of an ink-jet cartridge having a liquid-ejecting head.

FIG. 13 shows an example of the ink-jet cartridge mountable onto the ink-jet printing apparatus described above. The cartridge 1012 of this example is of a serial type, and is mainly constituted of an ink-jet printing head 100 and a liquid tank 1002 for containing an ink or a like liquid. The ink-jet printing head has many ejection orifices 832 for ejecting the liquid. The ink or a like liquid is introduced from the liquid tank 1002 through a delivery path (not shown in the drawing) to a common liquid chamber in the liquid ejection head 100 (see FIG. 14). The cartridge 1012 is formed in integration of ink-jet printing head 100 and the liquid tank 1002 in one body. The liquid can be replenished to the liquid tank 1002. The liquid tank 1002 may be connected exchangeably to the liquid ejection head 100.

A specific example of the liquid ejection head described above for the ink-jet printer having the aforementioned constitution is explained below in more detail.

Figure 14:
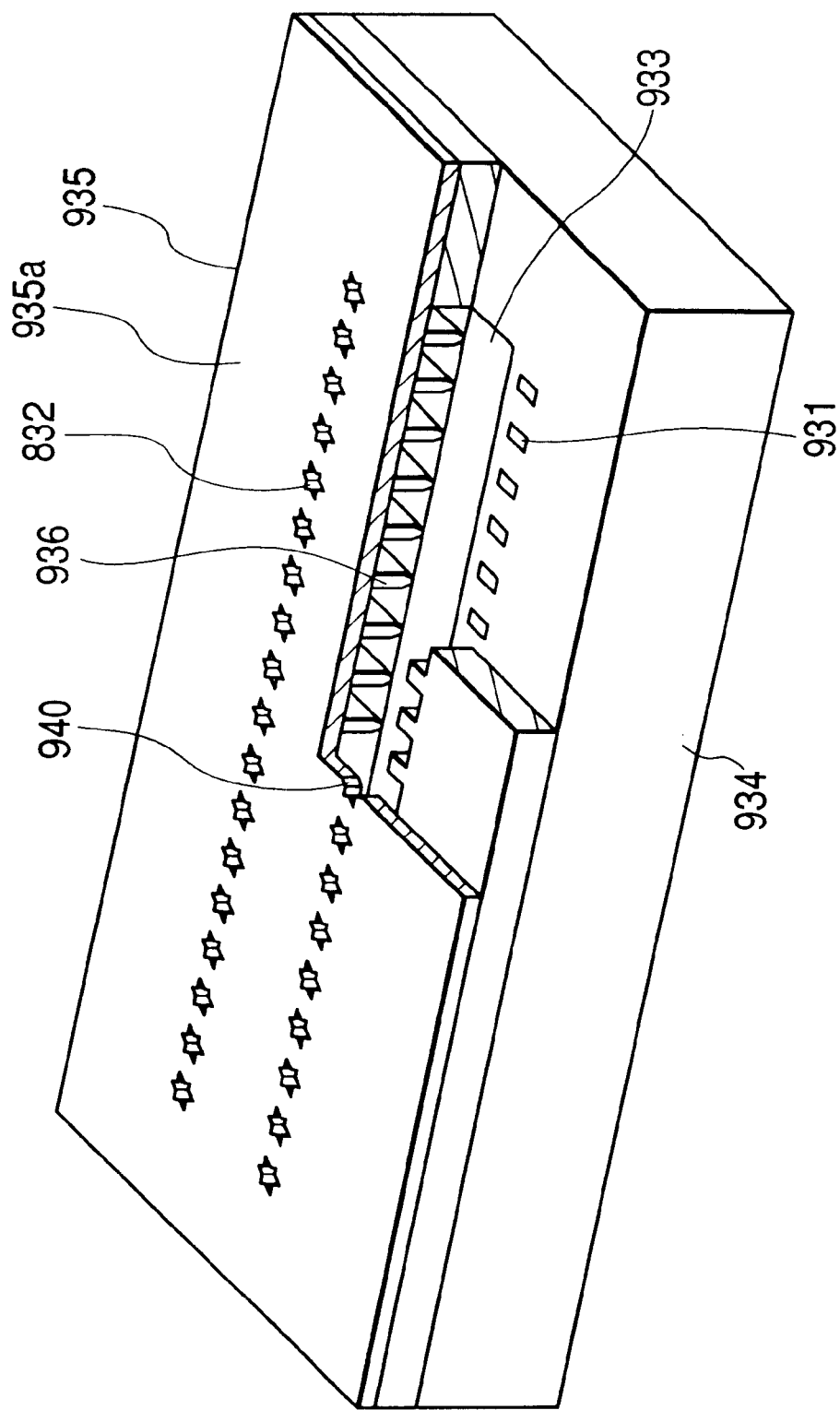
FIG. 14 is a schematic perspective view of the main portion of a liquid-ejecting head.

FIG. 14 is a schematic perspective view of the main portion of a basic embodiment of the liquid ejection head of the present invention. FIGS. 15 to 18 are front views illustrating the shape of the ejection orifice of the liquid ejection head shown in FIG. 14. In these drawings, electric wirings for driving the electrothermal transducing element are omitted.

The liquid ejection head of this example has a substrate 934 made of glass, ceramics, plastics, or metal as shown in FIG. 14. The material for the substrate is not essential of the present invention, and is not limited, provided that the material is capable of functioning as a part of the liquid flow path-constituting material, and functioning as a supporter for an ink-ejection energy generation element, a supporter for the material layer for forming the liquid path and the ejection orifice as described later. In this example, Si substrate (wafer) is employed as the substrate plate. The ejection orifice can be formed by a laser beam. Otherwise, the orifice plate (ejection orifice plate) 935 is made from a photosensitive resin, and the ejection orifice is formed by an optical aligner such as MPA (mirror projection aligner).

In FIG. 14, the substrate 934 has electro-thermal transducing elements 931 (hereinafter occasionally called "heater") and an ink-supplying hole 933 in a shape of a long ditch-shaped through hole as a common liquid chamber. On the both sides in the length direction of the ink supply hole 933, heaters 931 as thermal energy generating means are arranged in one line each in a staggered arrangement with the interval of 300 dpi, for example. Ink flow path walls 936 are formed on this substrate 934 for formation of ink flow paths. On the ink flow path walls 936, an ejection orifice plate 935 having ejection orifices 932 is provided.

In FIG. 14, the ink flow path walls 936 and the ejection orifice plate 935 are shown as separate members. However, the ink flow path walls 936 may be formed by a spin coating method to form simultaneously the ejection orifice plate 935 with the same material. In this example, the ejection orifice plate face 935a is treated for water repellency.

In this example, printing is conducted with a serial type head scanning in the arrow S direction in FIG. 12, for example, at dot density of 1200 dpi at driving frequency of 10 kHz with a minimum ejection time interval of 100 µs for each ejection orifice.

Figure 15:
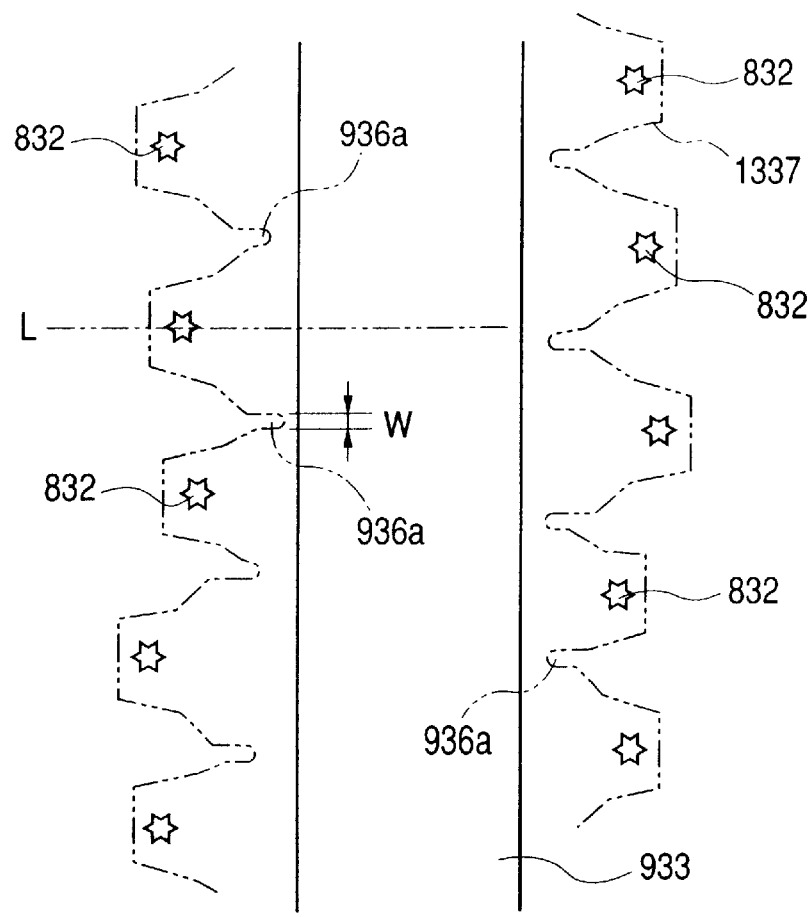
FIG. 15 is a conception diagram of a part of a liquid-ejecting head.
Figure 18:
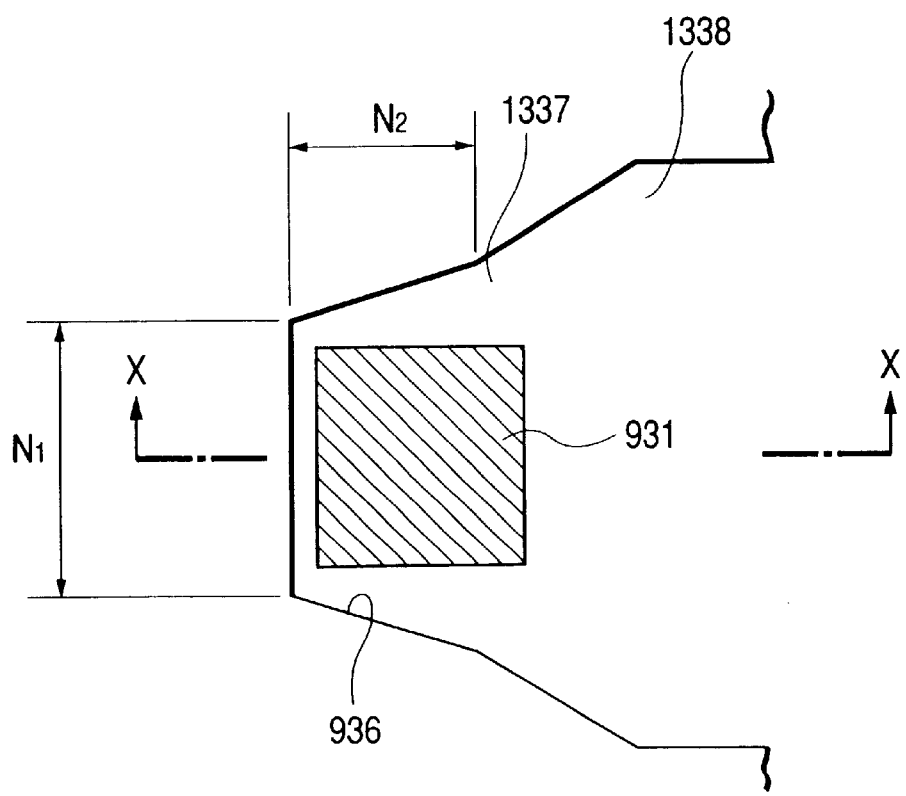
FIG. 18 is a schematic drawing of the main portion of the head shown in FIG. 15.

As to the practical dimension of the head, for example, the partition wall 936a for partitioning the fluid in adjacent nozzles as shown in FIG. 15 has a width w of 14 µm. In FIG. 18, a bubbling chamber 1337 formed from the ink flow path wall 936 has $N_1$ (width of bubbling chamber)=33 µm and $N_2$ (length of bubbling chamber)=35 µm. The heater 931 has a size of 30 µm ×30 µm, and a resistance of 53 Ω, and is driven by driving voltage of 10.3 V. The ink flow path wall 936 and the partition wall 936a has a height of 12 µm, respectively. The ejection orifice plate has a thickness of 11 µm.

The section 940 of the ejection orifice 832 taken in the direction perpendicular to the ink ejection direction (thickness direction of the orifice plate 935) is nearly in a shape of a star, which has six rising portions 832a with an obtuse angle and six falling portions 832b with an acute angle placed alternately. Thereby six grooves are formed along the direction of the orifice plate thickness (liquid ejection direction), the groove having the falling portions 832b as the tops far from the center O of the ejection orifice and the adjacent rising portions 832a near to the center O of the ejection orifice as the base. The position of the grooves is shown in FIG. 16 by a numeral 1141.

In this example, the ejection orifice 940 is in a shape of combination of two equilateral triangles, which have 27 µm of one side of a cross section by cutting in a crossing direction of thickness, shifted by a rotation angle of 60°. In FIG. 16, the length $T_1$ is 8 µm. The tops of the rising portions 832a have an angle of 120°, and the bases of the falling portions 832b have an angle of 60°.

Therefore, the center O of the ejection orifice coincides with the gravity center G of the polygon formed by connecting the middle points between the top and the base of the groove. In this example, the ejecting orifice has an opening area of 400 µm², and sectional area of one groove (area of a figure formed by connection the top and the adjacent two bottoms of the groove) is about 33 µm².

Figure 16:
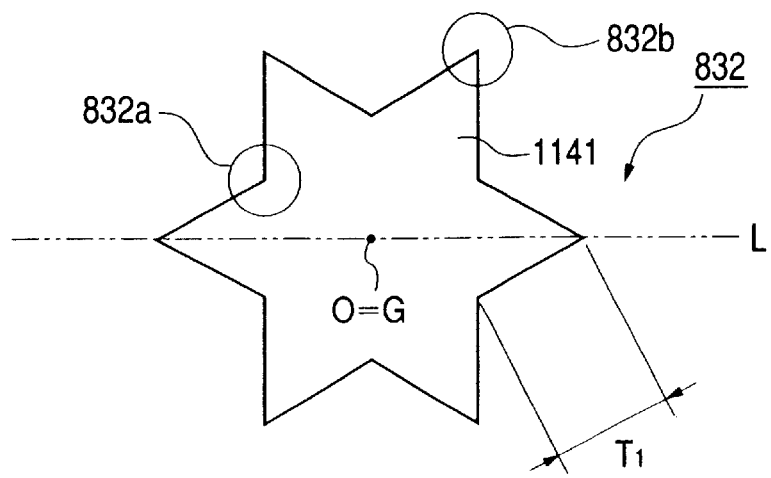
FIG. 16 is enlarged view of the ejection orifice of the liquid-ejection head shown in FIG. 15.
Figure 17:
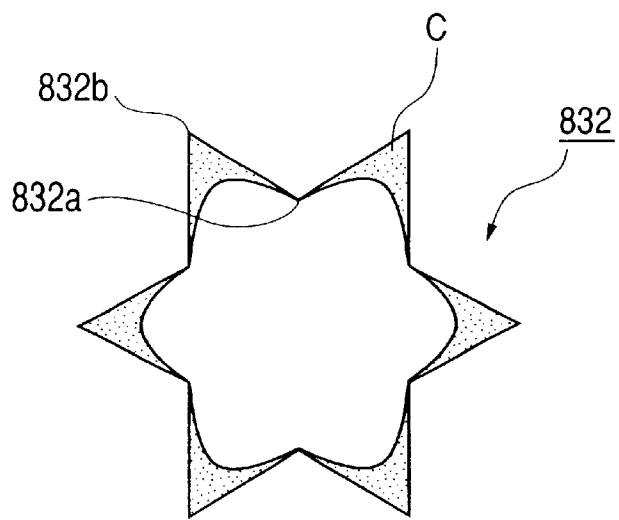
FIG. 17 is a schematic view illustrating adhesion of the ink at the ink-ejection orifice shown in FIG. 16.

FIG. 17 shows schematically the state of contact of the ink with the orifice wall at the ejection orifice shown in FIG. 16.

The process of ejection of the liquid through the ink-jet printing head of the above constitution is described by reference to FIGS. 19 to 26. FIGS. 19 to 26 are sectional views of the bubbling chamber 1337 taken along line X—X in FIG. 18 for explaining the process of liquid ejection in the liquid ejection head shown in FIGS. 14 to 18. In these sectional views, the ends of the ejection orifice 940 in the orifice plate thickness direction correspond to the tops 1141a of the grooves 1141.

Figure 19:
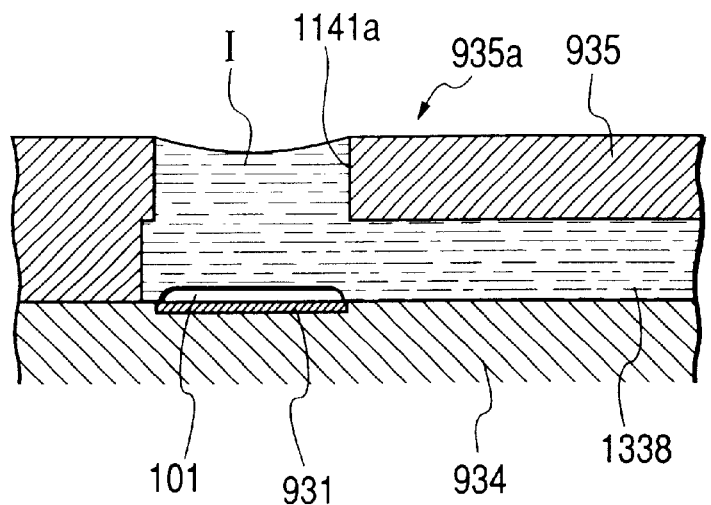
FIG. 19 is a schematic sectional view for explaining the process of the liquid ejection through the liquid-ejection head with lapse of time corresponding to the sectional view at X—X in FIG. 18 in combination with FIGS. 20 to 26.
Figure 20:
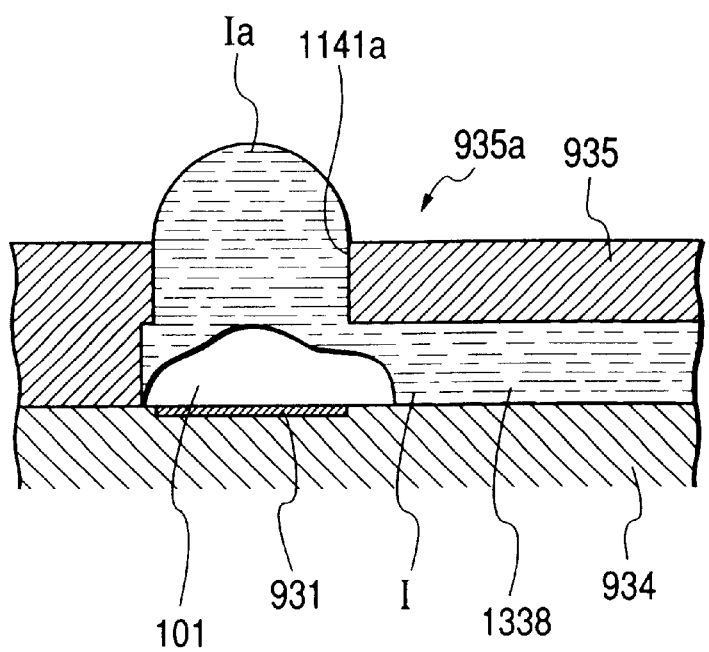
FIG. 20 is a schematic sectional view for explaining the process of the liquid ejection through the liquid-ejection head with lapse of time corresponding to the sectional view at X—X in FIG. 18 in combination with FIG. 19 and FIGS. 21 to 26.
Figure 21:
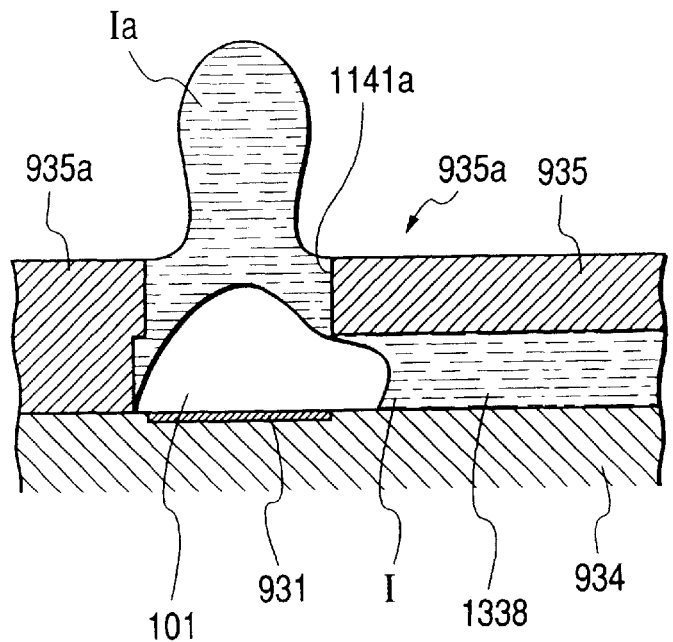
FIG. 21 is a schematic sectional view for explaining the process of the liquid ejection through the liquid-ejection head with lapse of time corresponding to the sectional view at X—X in FIG. 18 in combination with FIGS. 19, 20 and FIGS. 22 to 26.
Figure 22:
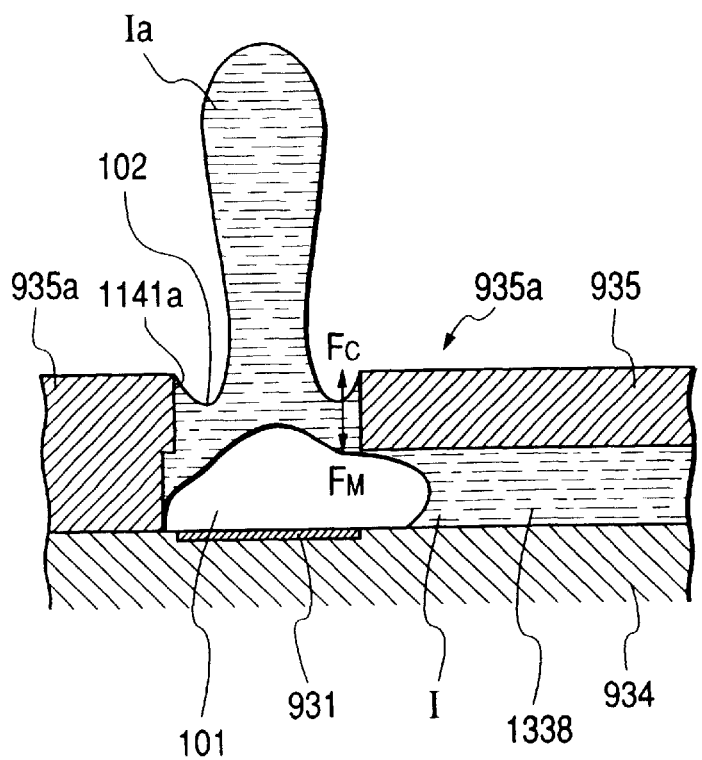
FIG. 22 is a schematic sectional view for explaining the process of the liquid ejection through the liquid-ejection head with lapse of time corresponding to the sectional view at X—X in FIG. 18 in combination with FIGS. 19 to 21 and FIGS. 23 to 26.
Figure 23:
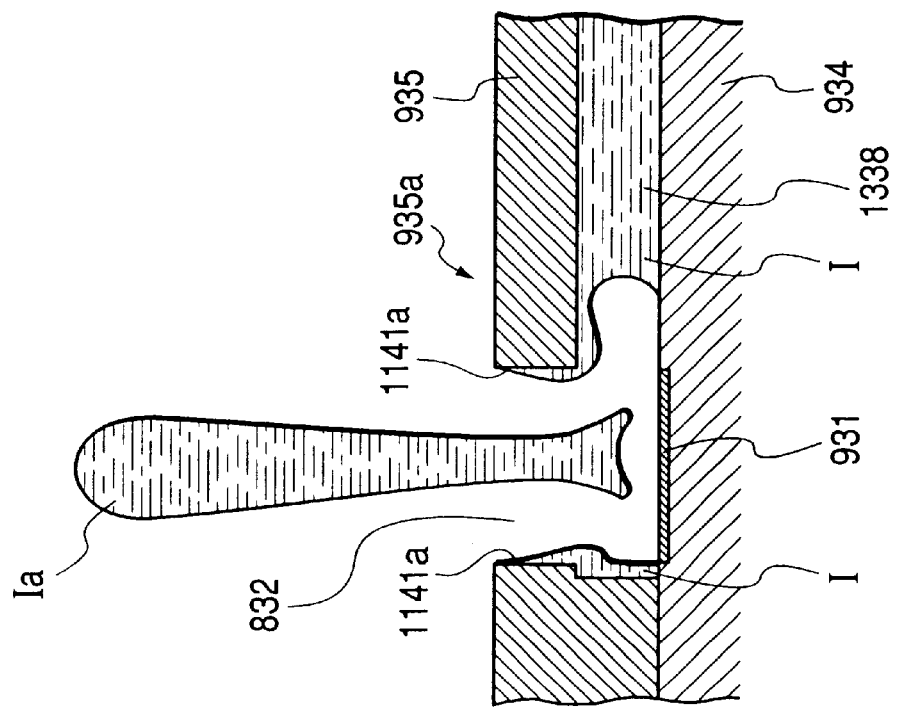
FIG. 23 is a schematic sectional view for explaining the process of the liquid ejection through the liquid-ejection head with lapse of time corresponding to the sectional view at X—X in FIG. 18 in combination with FIGS. 19 to 22 and FIGS. 24 to 26.

FIG. 19 shows bubble formation in a film state on a heater. FIG. 20 shows the state at about 1 µs after the state of FIG. 19. FIG. 21 shows the state at about 2 µs; FIG. 22, at about 3 µs; FIG. 23, at about 4 µs; and FIG. 24, at about 5 µs; FIG. 25, at about 6 µs; and FIG. 26, at about 7 µs after the state of FIG. 19. In the description below, the term "fall" or "falling" signifies the movement toward the electro-thermal transducer, not fall to the gravity direction regardless of the head fixation direction.

Firstly, electric current is applied to a heater 931 in correspondence with a signal. Thereby a bubble 101 is formed on the heater 931 in the liquid flow path 1338 as shown in FIG. 19. In about 2 µs, the bubble grows rapidly in volume as shown in FIGS. 20 and 21. At the maximum volume of the bubble 101, the bubble height exceeds the height of the ejection orifice face 935a. In this state, the gas pressure in the bubble comes to decrease to be from several fractions to ten and odds of fractions of the atmospheric pressure.

At about 2 µs after the formation of the bubble 101, the bubble as mentioned above begins to constrict from the maximum volume, and at about the same time the meniscus 102 begins to form. This meniscus 102 also moves backward or falls toward the heater 931 as shown in FIG. 22.

In this example, when the meniscus moves backward, the plural grooves 1141 distributed in the ejection orifice exerts capillary force to the liquid in the direction Fc reverse to the backward movement direction FM at the groove 1141. Consequently, any variation of the state of the bubble 101 can be corrected such that the shape of the meniscus moving backward and the shape of the main liquid droplet Ia (hereinafter called "liquid" or "ink" occasionally) are nearly symmetrical to the center of the ejection orifice.

In this example, the falling velocity of the meniscus 102 is higher than the constriction velocity of the bubble 101, so that the bubble 101 comes to communicate with the open air near the lower face of the ejection orifice 832 at about 4 µs after the formation of the bubble as shown in FIG. 23. At the same time, the portion of the liquid (ink) near the center axis of the ejection orifice 832 falls toward the heater 931, since the liquid (ink) Ia brought back by the negative pressure before the communication of the bubble with the open air has a velocity toward the heater 931 owing to inertia after the communication with air.

Figure 24:
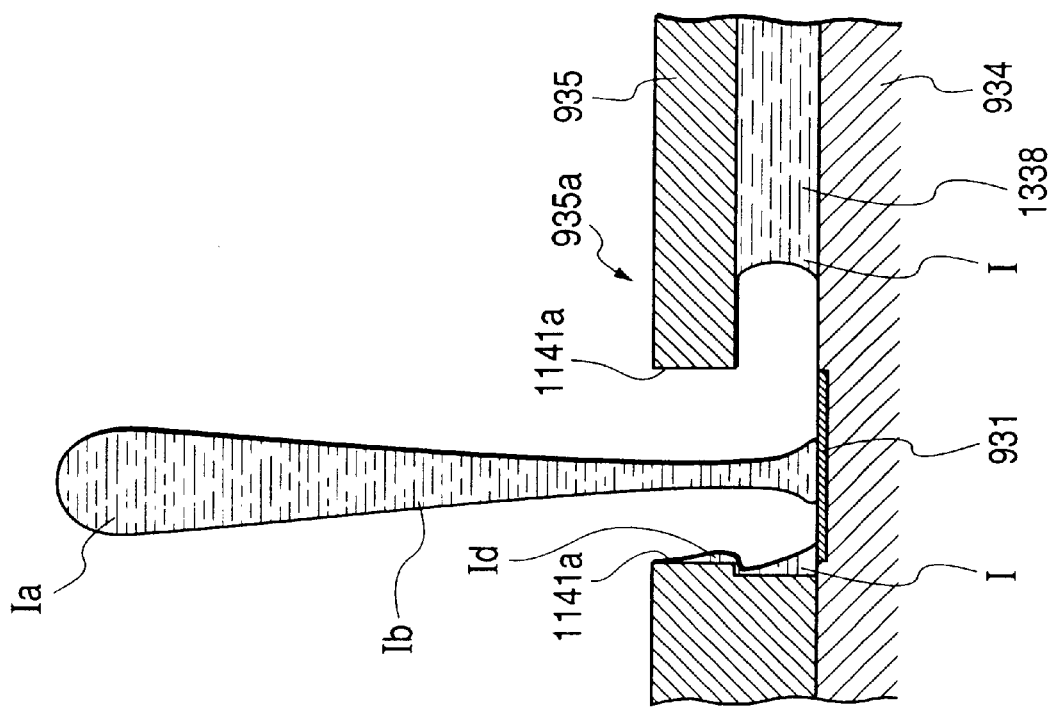
FIG. 24 is a schematic sectional view for explaining the process of the liquid ejection through the liquid-ejection head with lapse of time corresponding to the sectional view at X—X in FIG. 18 in combination with FIGS. 19 to 23 and FIGS. 25 and 26.
Figure 25:
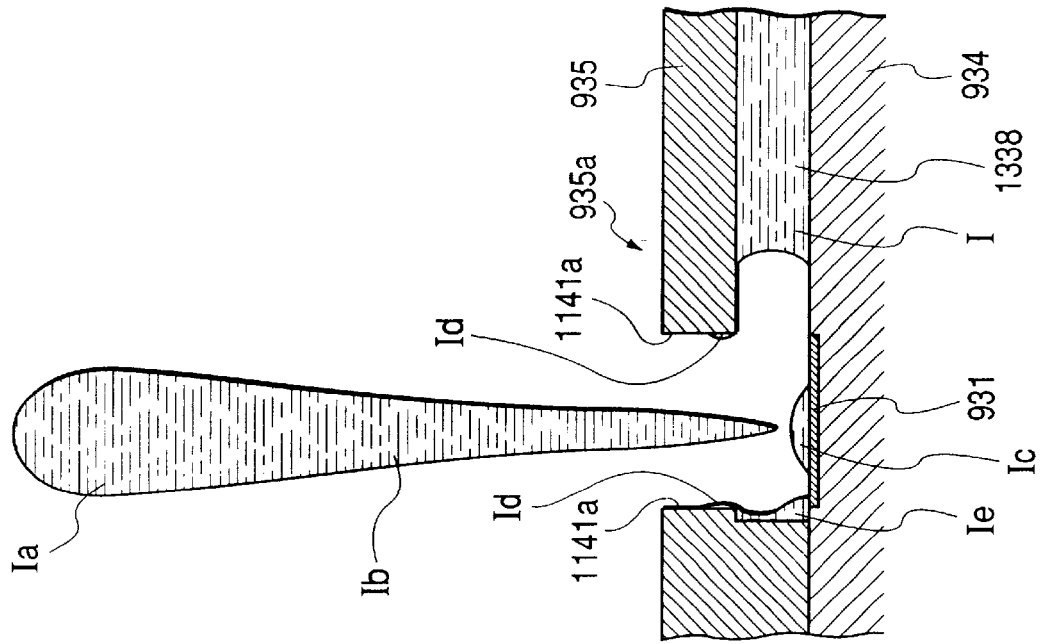
FIG. 25 is a schematic sectional view for explaining the process of the liquid ejection through the liquid-ejection head with lapse of time corresponding to the sectional view at X—X in FIG. 18 in combination with FIGS. 19 to 24 and FIG. 26.

The liquid (ink) having fallen toward the heater 931 reaches the surface of the heater 931 at about 5 µs after the formation of the bubble 101 as shown in FIG. 24, and spreads to cover the surface of the heater 931 as shown in FIG. 25. The liquid spreading over the surface of the heater 931 has a velocity vector along the surface of the heater 931 in the horizontal direction, but loses the vector crossing the surface of the heater 931, vertical vector. Therefore, this portion of the liquid tends to remain on the surface of the heater 931 to pull down the liquid having the velocity vector in the ejection direction.

Figure 26:
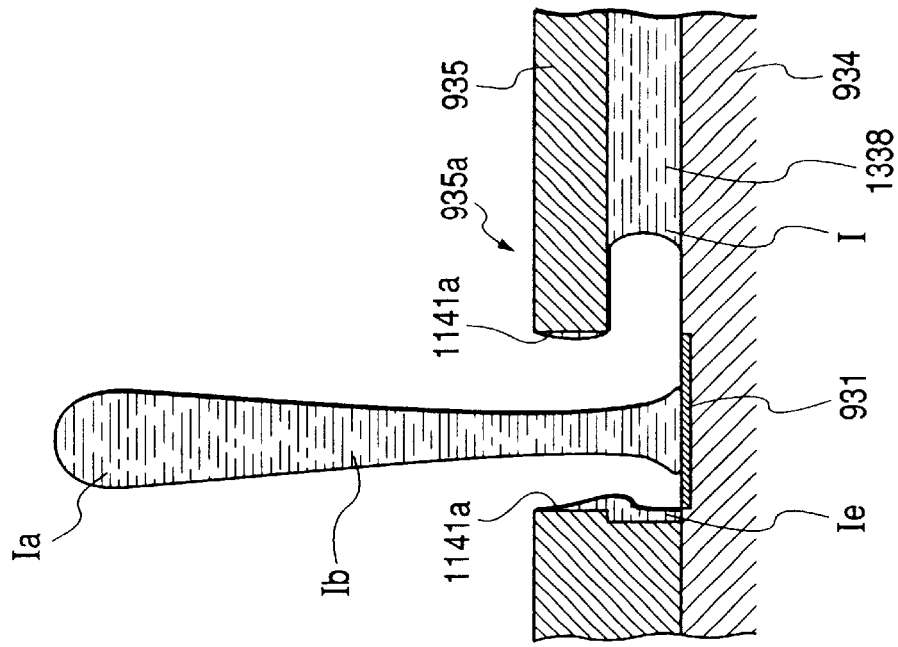
FIG. 26 is a schematic sectional view for explaining the process of the liquid ejection through the liquid-ejection head with lapse of time corresponding to the sectional view at X—X in FIG. 18 in combination with FIGS. 19 to 25.

Thereafter, a portion Ib of the liquid between the liquid spreading on the surface of the heater 931 and the liquid (main liquid droplet) on the upper side becomes thinner. At about 7 µs after the formation of the bubble 101, the portion of the liquid Ib is cut at the center of the surface of the heater 931 as shown in FIG. 26, thereby the main liquid droplet Ia having a velocity vector in the ejection direction is separated from the liquid Ic spreading on the surface of the heater 931. The separation is caused preferably inside the liquid flow path 1338, more preferably nearer to the electro-thermal transducer element 931 than to the ejection orifice 832.

The main liquid droplet Ia is ejected through the center portion of the ejection orifice 832 without deviation of the direction and without deformation to fly onto the prescribed position of a printing face of a printing medium. The liquid Ic spreading on the surface of the heater 931 remains on the surface of the heater 931, while in a conventional method the liquid Ic is driven out as a satellite droplet following the main liquid droplet.

By the prevention of the satellite droplet ejection as above, the splashing which tend to be formed by the satellite droplet can be prevented, and soiling of the printing face of the printing medium caused by mist is surely prevented. In FIGS. 23 to 26, the symbol Id indicates the ink adhering to the groove (ink in the groove), and the symbol Ie indicates the ink remaining in the liquid flow path.

With the liquid ejection head of this example, the liquid is ejected in the constriction stage of the bubble after growth to the maximum volume of the bubble, and the ejection direction of the main liquid droplet is stabilized by the plural grooves distributed around the center of ejection orifice. Thereby, the liquid ejection head ejects the liquid droplet without deviation of the ejection direction with high landing precision of the liquid droplets. Further, the ejection can be stabilized even at variation of bubbling at a high driving frequency to realize high-speed fine printing.

In particular, with the liquid ejection head of this example, the liquid droplet is ejected at the bubble constriction stage by communication of the bubble with the open air, whereby mist generation at the ejection by communication with the open air can be prevented, and the adhesion of the liquid droplet onto the ejection orifice face which may cause abrupt failure of the ejection can also be prevented.

Another type of printing head suitable for practicing the present invention is an edge-shooter type head disclosed in Japanese Patent No. 2,783,647, which conducts liquid droplet ejection by communication of the bubble with the open air on the liquid droplet ejection.

The present invention is effective for the ink-jet type printing head and printing apparatus which ejects liquid droplets by utilizing thermal energy to conduct printing.

The typical constitution and the principle thereof are disclosed in U.S. Pat. Nos. 4,723,129 and 4,740,796. This type of constitution can be applicable to so-called on-demand type ones, and continuous type ones. In particular, this type apparatus is effective as an on-demand type apparatus. In the on-demand type apparatus, at least one driving signal causing quick temperature rise exceeding the nuclear boiling temperature corresponding to printing information is applied to an electro-thermal transducer arranged on a liquid-retaining sheet or a liquid flow path to generate thermal energy to cause film boiling at the heating face of a printing head, and consequently to form a bubble in the liquid (ink) corresponding one-to-one to the driving signal. The growth and constriction of the bubble is utilized in ejection of the liquid (ink) through the ejection orifice to form a liquid droplet. A pulsed driving signal is preferred for quick and precise bubble growth and constriction to achieve liquid (ink) ejection with high responsiveness.

As the pulsed driving signal, suitable are those disclosed in U.S. Pat. Nos. 4,463,359 and 4,345,262. The printing can be conducted more satisfactorily by employing the conditions of temperature elevation rate of the heating face disclosed in U.S. Pat. No. 4,313,124.

The printing heads having constitution in which the heating portion is placed in a bent region as disclosed in U.S. Pat. No. 4,558,333, and 4,459,600 are included in the present invention, in addition to the printing head disclosed in the above-cited patents having constitution of combination of an ejection orifice, a liquid flow path, and an electro-thermal transducer.

The present invention is effective also for the constitution disclosed in Japanese Patent Application Laid-Open No. 59-123670 in which a common slit is employed for plural electro-thermal transducers, or for the constitution disclosed in Japanese Patent Application Laid-Open No. 59-138461 in which an opening is provided for ejection portion for absorbing pressure waves of thermal energy.

The present invention is also effective for a full-line type printing head which has a head length corresponding to the maximum printing breadth of the printing medium. The full-line type printing head may have a constitution in which plural printing heads as described in aforementioned patents are combined for the length, or may have a constitution in which the head is constructed in one body.

The present invention is also effective for exchangeable tip type printing heads which can be connected electrically to the main apparatus body and receive supply of the ink from the main apparatus body, and for a cartridge type printing head which has an ink tank provided integrally with the printing head.

A recovery means for the printing head and other auxiliary means may be added to the printing head apparatus of the present invention for stabilizing the effects of the present invention. The additional means include head capping means, head cleaning means, head pressurizing or sucking means, preliminary heating means separate from or combined with the electro-thermal transducer. The practice of preliminary ejection mode is also effective for the stable printing.

The printing mode of the printing apparatus is not limited to one-main-color printing mode of black or another color, but may be a plural-color mode or a full-color mode by use of an integrally constituted head or combination of plural heads.

In the above examples of the present invention, the liquid ink is used for the explanation. However, the ink may be the one which solidifies at room temperature or lower, and softens or liquified at room temperature. In the ink-jet printing, the ink may be the one which becomes liquid at the time of signal application, since the ink is generally controlled to be at a temperature of 30 to 70° C. to control the ink viscosity for stable ejection.

The temperature rise of the ink by the thermal energy may be prevented by the latent heat of the change of the state between the solid and the liquid. The ink may be the one which is solid in a storage state for evaporation prevention. The present invention is applicable also to use of the ink which can be liquified by the thermal energy in correspondence with printing signals, ejected as a liquid ink, and begins to solidify at the time of landing onto a printing medium. The ink may be held in a liquid stat or a solid state in a cavity or through-hole of a porous sheet, opposing an electro-thermal transducer as disclosed in Japanese Patent Application Laid-Open Nos. 54-56847 and 60-71260. The present invention is most effective for practice of the film boiling system.

The printing apparatus for the present invention includes not only an image output terminal of information processing apparatus combined integrally or provided separately such as word processor and computer, but also copying machines in combination with a reader, and facsimile machines for sending or receiving information.

Figure 27:
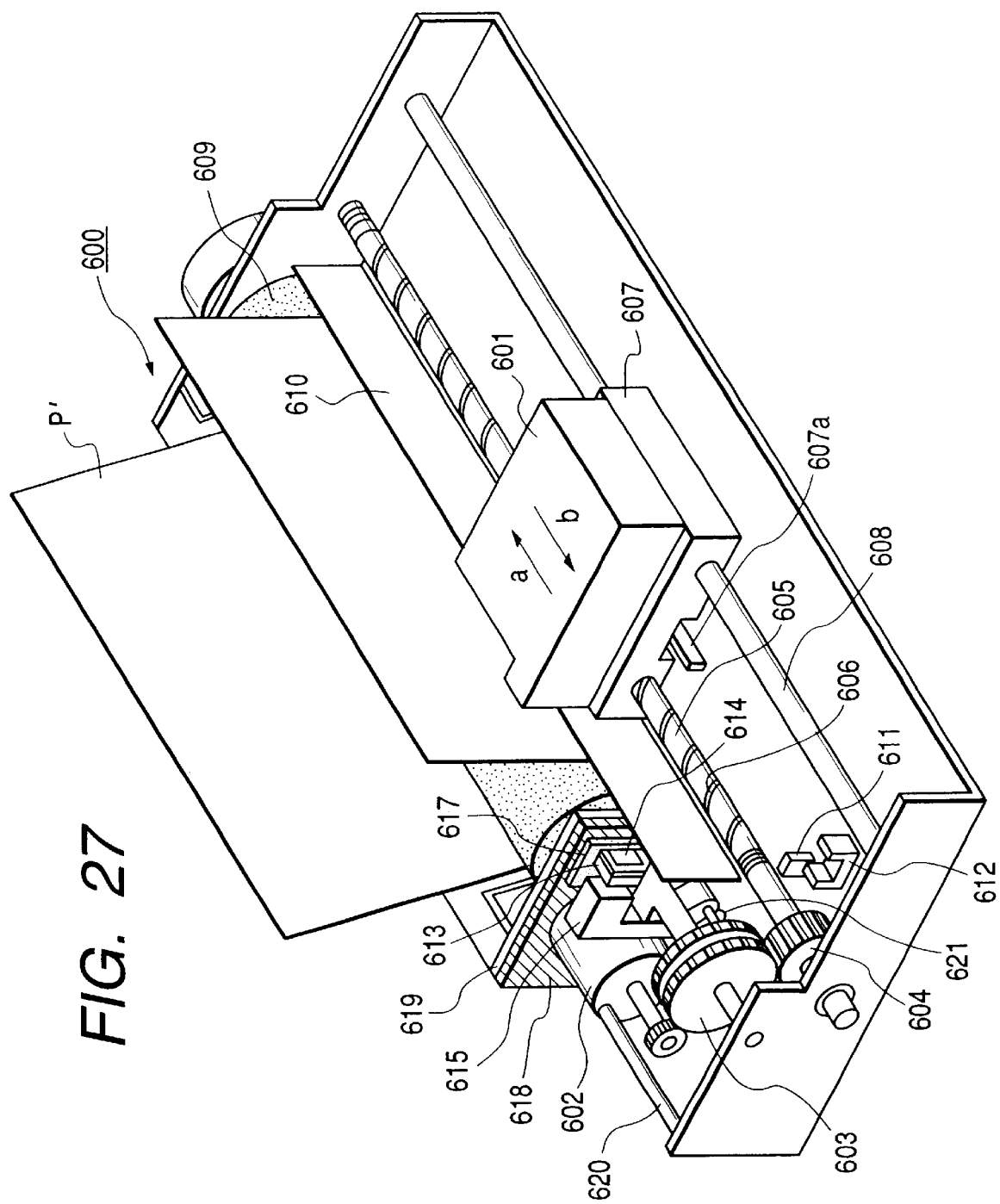
FIG. 27 is a schematic perspective view of an ink-jet printing apparatus 600 as an example of the liquid-ejection apparatus for mounting the liquid-ejection head of the present invention.

A liquid ejection apparatus employing a liquid ejection head of the present invention is described briefly below. FIG. 27 is a schematic perspective view of an example of an ink-jet printing apparatus 600 employing the liquid ejection head of the present invention.

In FIG. 27, the ink-jet head cartridge 601 is a combination in one body of the aforementioned liquid ejection head and an ink tank holding the ink to be supplied to the liquid ejection head. This ink-jet head cartridge 601 is mounted onto a carriage 607 which engages with a screw groove 606 of a lead screw 605 driven to rotate reversibly through transmission gears 603, 604 by driving motor 602. The ink-jet head cartridge 601 together with the carriage 607 is moved reciprocatingly in the directions indicated by arrows a and b by the driving motor 602 along with guide 608. A printing medium P is delivered on a platen roller 609 by a printing medium-delivering means not shown in the drawing, and is pushed against a platen roller 609 along the movement directions of the carriage 607.

Photo-couplers 611, 612 are provided near the one end of the lead screw 605. The photo-couplers detect the lever 607a of the carriage 607 at the home position to conduct switching of rotation direction of the driving motor 602 and other operation.

A supporting member 613 supports a capping member 614 to cap the front face (ejection face) of the ejection orifice of the ink-jet head cartridge 601. An ink-sucking means 615 sucks the ink in the capping member 614 accumulated by blank ejection or a like operation from the ink-jet head cartridge 601. This ink sucking means 615 sucks the ink-jet head cartridge 601 through an opening (not shown in the drawing) of the cap for the head performance recovery. A cleaning blade 617 is provided so as to be movable in forward and backward directions (perpendicular to the movement direction of the carriage 607) for wiping of the ejection orifice face of the ink-jet head cartridge 601. The cleaning blade 617 and a movement member 618 are supported by a main body supporter 619. The type of the cleaning blade 617 is not limited thereto and may be any known type cleaning blade.

In the recovery of performance of the liquid ejection head by sucking, a lever 620 for start of sucking is moved by the movement of a cam 621 engaging with the carriage 607. The driving force of the driving motor 602 is controlled by a switching clutch or a like transmission means. A control section for the ink-jet printing is equipped in the main body of the apparatus. This control section applies signals to the heat generator in the liquid ejection head of the ink-jet head cartridge 601 and controls the aforementioned mechanisms. The control system is not shown in the drawing.

The ink-jet printing apparatus 600 of the above constitution conducts printing on a printing medium P' delivered on a platen roller 609 by a printing medium delivering means not shown in the drawing. For the printing, the ink-jet head cartridge 601 moves reciprocally over the entire width of the printing medium P'.

As described above, the present invention achieves the effects below:

(1) The ink of the present invention forms steadily high-quality images with less influence of the property of the printing medium on the image quality.

(2) The ink of the present invention gives high rub resistance of the prints irrespective of the kind of the printing medium.

(3) The ink set of the present invention prevents bleeding effectively.

(4) The ink, ink set, ink cartridge, printing unit, image-printing apparatus, and ink-jet printing method of the present invention forms steadily high-quality images with less influence of the property of the printing medium on the image quality.

(5) The present invention enables steady formation of image with a high density and a high color chroma.

EXAMPLES

The present invention is described below more specifically by reference to Examples and Comparative Examples. In the description, the unit "parts" or "%" is based on weight unless otherwise mentioned.

Example 1

Firstly, a self-dispersible pigment was prepared. A portion of 10 parts of carbon black having a surface area of 230 $m^2$/g and DBP oil absorbency of 70 ml/100 g, and 3.41 parts of p-amino-benzoic acid were mixed well with 72 parts of water. Thereto, 1.62 parts of nitric acid was added dropwise. The mixture was stirred at 70° C. After several minutes of stirring, was added thereto a solution of 1.07 parts of sodium nitrite in 5 parts of water. The mixture was stirred for one hour more. The resulting slurry was filtered through a filter paper (trade name: Toyo Roshi No.2, produced by Advantice Co.). The collected particulate pigment was washed sufficiently with water and was dried in an oven at 90° C.

Microcapsule enclosing a pigment liquid dispersion were prepared as below. Firstly, a liquid mixture was prepared by mixing 175 parts of n-butyl methacrylate, 10.7 parts of n-butyl acrylate, 37.5 parts of β-hydroxyethyl methacrylate, 26.8 parts of methacrylic acid, and 20 parts of t-butyl peroxyoctoate. The above liquid mixture was added dropwise to 250 parts of methyl ethyl ketone kept at 75° C. under nitrogen atmosphere with stirring in two hours. The reaction was allowed to proceed at that temperature for 15 hours to obtain a resin solution. Next, 11.6 parts of this resin solution, 1.6 parts of diethanolamine, 30 parts of the above-prepared pigment were mixed, and pure water was added thereto to the total amount of 150 parts. Thereto, 500 g of zirconia beads having average particle diameter of 0.5 mm was added. The mixture was blended by a paint shaker for 4 hours. The zirconia beads were removed by filtration to obtain a dispersion containing the resin and pigment. The dispersion was diluted with pure water to a double volume with stirring. Thereto, 1N hydrochloric acid was added dropwise with stirring until the resin is insolubilized to deposit onto the coloring material. The pH value at this moment was 3 to 5. The mixture was filtered with suction, and the salt was removed with water washing to obtain a water-containing cake. An aqueous 10% diethanolamine solution was added thereto with stirring to adjust the pH to 8.5 to 9.5. The stirring was continued for one more hour. Liquid Dispersion D was prepared by adjusting the non-volatile matter concentration to 15%.

Liquid Dispersion C was prepared in the same manner except that the amount of the resin solution was changed from 11.6 parts to 5.8 parts. Liquid Dispersion B was prepared in the same manner except that the amount of the resin solution was changed to 2.9 parts. Liquid Dispersion A was prepared in the same manner except that the amount of the resin solution was changed to 1.2 parts and the amount of the pigment was changed to 60 parts. Regarding the capsulated carbon black in the Liquid Dispersions A, B, C and D, the approximate content of the organic polymer to the carbon black was 1%, 5%, 10%, and 20%, respectively.

Content of organic polymer to the carbon black:
Liquid Dispersion A: 1%
Liquid Dispersion B: 5%
Liquid Dispersion C: 10%
Liquid Dispersion D: 20%

The solid matter of the respective liquid dispersions obtained by evaporation was subjected to infrared absorption spectrum measurement by Fourier transform infrared spectrometer (FTS-135/UMA500, manufactured by Bio-Rad Laboratories Co.). From the measurement of the peak intensity ratio in the infrared absorption spectra (hereinafter referred to as "FT-IR" (FT means Fourier transform)), it was confirmed that a part of the pigment is uncovered substantially in the respective dispersions.

The components below were mixed (total amount: 100 parts) and stirred well to dissolve the components. Then the mixture was filtered with pressure through a microfilter of pore size 3 μm (produced by Fuji Film Co.) to prepare black inks of the present invention.

(Black Ink 1)

| | |
|---|---|
| Pigment Liquid Dispersion A | 33.7 parts |
| Trimethylolpropane | 6 parts |
| Glycerin | 6 parts |
| Diethylene glycol | 6 parts |
| Acetylene glycol-ethylene oxide adduct (trade name: Acetylenol EH; produced by Kawaken Fine Chemical K.K.) | 0.2 part |
| Water | Balance |

(Black Ink 2)
The black ink was prepared in the same manner except that 35.1 parts of Pigment Liquid Dispersion B was used in place of Pigment Liquid Dispersion A.
(Black Ink 3)
The black ink was prepared in the same manner except that 37.0 parts of Pigment Liquid Dispersion C was used in place of Pigment Liquid Dispersion A.
(Black Ink 4)
The black ink was prepared in the same manner except that 41.7 parts of Pigment Liquid Dispersion D was used in place of Pigment Liquid Dispersion A.

Comparative Ink 1

A black ink as Comparative Ink 1 was prepared in the same manner as Black Ink 1 except that 33 parts of a pigment dispersion was used which contained the self-dispersible type carbon black at a ratio of 15% by weight, in place of Pigment Liquid Dispersion A.
(Comparative Ink 2)

A capsuled pigment-containing liquid dispersion was prepared in the same manner as Liquid Dispersion D except that the amount of the resin solution was changed from 11.6 parts to 17.5 parts in the preparation step of the liquid dispersion D in Example 1. A black ink as Comparative Ink 2 was prepared in the same manner as Black Ink 1 except that 47.6 parts of the above liquid dispersion was used in place of Pigment Liquid Dispersion A.

In Comparative Ink 1, the content of the organic polymer to the carbon black was 0%. In Comparative Ink 2, the content of the organic polymer to the carbon black was about 30%. The state of coverage of the coloring material with the organic polymer in Comparative Inks 1 and 2 was examined by the FT-IR as mentioned above. As the results, in Comparative Ink 1, the coloring material was partly uncovered, whereas in Comparative Ink 2, the coloring material was substantially entirely covered.

Black Inks 1 to 4 and Comparative Inks 1 and 2 were evaluated for the test items below by means of an ink-jet printer (trade name: BJC-4000,manufactured by Canon K.K.) having an on-demand type multiple printing head which ejects ink by application of thermal energy. The results are shown in Table 1.

[1] Optical Density of Print

Printing was conducted with the above inks on five kinds of copying PPC paper A, B, C, D, and E by the above-mentioned ink-jet printer.

A: PPC paper NSK, supplied by Canon K.K.

B: PPC paper NDK, supplied by Canon K.K.

C: PPC paper 4024, supplied by Xerox Co.

D: PPC paper Proper Bond, supplied by Fox River Co.

E: PPC paper for Canon, supplied by Neusiedler Co.

The optical density was measured by an optical density of print measuring device manufactured by MacBeth Co., and was evaluated by the average of the print densities on Paper Sheets A, B, C, D, and E according to the standards below.

a: The average is not less than 1.35 (including 1.35)

b: The average is not less than 1.25, but less than 1.35 c: The average is less than 1.25

[2] Rub Resistance

Printing was conducted with the above inks on five kinds of copying PPC paper A, B, C, D, and E by the above-mentioned ink-jet printer. After standing for one day, the printed paper sheet was rubbed with a weight at a load of 40 g/cm². The rub resistance was evaluated according to the standard below.

a: Blurring is not remarkable on every test sheet b: Blurring is remarkable on some of the test sheets c: Blurring is remarkable on all test sheets Table 1 shows the evaluation results.

As shown in Table 1, the ink of the present invention gives high print density and high rub resistance in ink-jet printing.

Example 2

Microcapsule enclosing a pigment liquid dispersion was prepared as below. The carbon black treated and employed in Example 1 was dispersed well in water at a solid matter content of 15% in a total amount of 1 kg. To this liquid dispersion, a dilute sulfuric acid solution was added to deposit the pigment (pH was about 3). To this solution, 150 g of an aqueous 20% solution of Poval (produced by Kuraray Co.) was added dropwise with stirring. The solution was neutralized with an aqueous ammonium hydroxide to obtain Liquid Dispersion H.

Liquid Dispersion G was prepared in the same manner except that the amount of the aqueous Poval solution was changed from 150 g to 75 g. Liquid Dispersion F was prepared in the same manner except that the amount of the aqueous Poval solution was changed to 37.5 g. Dispersion E was prepared in the same manner except that the amount of the aqueous Poval solution was changed to 7.5 g.

Regarding the capsulated carbon black in the Liquid Dispersions E, F, G and H, the approximate content of the organic polymer to the carbon black was 1%, 5%, 10%, and 20%, respectively.

Content of organic polymer to the carbon black:

Liquid Dispersion E: 1%

Liquid Dispersion F: 5%

Liquid Dispersion G: 10%

Liquid Dispersion H: 20%

The solid matter of the respective liquid dispersions obtained by evaporation was subjected to infrared absorption spectrum measurement (FT-IR). From the measurement of the peak intensity ratio in the infrared absorption spectra, it was confirmed that a part of the pigment is uncovered practically in the respective dispersions.

The components below were mixed (total amount: 100 parts) and stirred well to dissolve the components. Then the mixture was filtered with pressure through a microfilter of the pore size 3 μm (produced by Fuji Film Co.) to prepare black inks of the present invention.

(Black Ink 5)

| | |
|---|---|
| Pigment Liquid Dispersion E | 33.7 parts |
| Trimethylolpropane | 6 parts |
| Glycerin | 6 parts |
| Diethylene glycol | 6 parts |
| Acetylene glycol-ethylene oxide adduct (trade name: Acetylenol EH; produced Kawaken Fine Chemical K.K.) | 0.2 part |
| Water | Balance |

(Black Ink 6)

The black ink was prepared in the same manner except that 35.1 parts of Pigment Liquid Dispersion F was used in place of Pigment Liquid Dispersion E.

(Black Ink 7)

The black ink was prepared in the same manner except that 37.0 parts of Pigment Liquid Dispersion G was used in place of Pigment Liquid Dispersion E.

(Black Ink 8)

The black ink was prepared in the same manner except that 41.7 parts of Pigment Liquid Dispersion H was used in place of Pigment Liquid Dispersion E.

(Comparative Ink 3)

A black ink as Comparative Ink 3 was prepared in the same manner as Black Ink 5 except that 33 parts of a non-encapsuled self-dispersible pigment dispersion was used in place of Pigment Liquid Dispersion E.

Comparative Ink 4

A capsuled pigment-containing liquid dispersion was prepared in the same manner as Liquid Dispersion H except that the amount of the aqueous Poval solution was changed to 225 g. A black ink as Comparative Ink 4 was prepared in the same manner as Black Ink 5 except that 47.6 parts of the above liquid dispersion was used in place of Pigment Liquid Dispersion E.

In Comparative Ink 3, the content of the organic polymer to the carbon black was 0%. In Comparative Ink 4, the content of the organic polymer to the carbon black was about 30%. The state of coverage of the pigment with the organic polymer in Comparative Inks 3 and 4 was examined by the FT-IR. As the results, in Comparative Ink 3, the coloring material was partly uncovered, whereas in Comparative Ink 4, the coloring material was substantially entirely covered.

Black Inks 5 to 8 and Comparative Inks 3 and 4 were evaluated for the same test items according to the same evaluation standard as in Example 1. The results are shown in Table 2.

As shown in Table 2, the ink of the present invention gives high print density and high rub resistance in ink-jet printing.

Example 3

Microcapsule enclosing a pigment liquid dispersion was prepared as below. Firstly, 175 parts of n-butyl methacrylate, 10.7 parts of n-butyl acrylate, 37.5 parts of P-hydroxyethyl methacrylate, 26.8 parts of methacrylic acid, and 20 parts of t-butyl peroxyoctoate were mixed. The above mixture was added dropwise to 250 parts of methyl ethyl ketone kept at 75° C. under nitrogen atmosphere with stirring in two hours. Further, the reaction was allowed to proceed at that temperature for 15 hours to obtain a resin solution. Next, 11.6 parts of this resin solution, 1.6 parts of diethanolamine, 30 parts of a carbon pigment (MA-600, produced by Mitsubishi Chemical Co.) were mixed, and pure water was added thereto to the total amount of 150 parts. Thereto, 500 g of zirconia beads having an average particle diameter of 0.5 mm was added thereto. The mixture was blended by a paint shaker for 4 hours. The zirconia beads were removed by filtration to obtain a dispersion containing the resin and pigment. The dispersion was diluted with pure water to a double volume with stirring, and thereto, 1N hydrochloric acid was added dropwise with stirring until the resin is insolubilized to deposit onto the coloring material. The pH value at this moment was 3 to 5. The mixture was filtered with suction, and the salt was removed with water washing to obtain a water-containing cake. Thereto, an aqueous 10% diethanolamine solution was added with stirring to adjust the pH in the range of 8.5 to 9.5. The stirring was continued for one more hour. Liquid Dispersion L was prepared by adjusting the nonvolatile matter concentration to 15%.

Liquid Dispersion K was prepared in the same manner as the Liquid Dispersion L except that the amount of the resin solution was changed from 11.6 parts to 5.8 parts. Liquid Dispersion J was prepared in the same manner except that the amount of the resin solution was changed to 2.9 parts. Liquid Dispersion I was prepared in the same manner except that the amount of the resin solution was changed to 1.2 parts and the amount of the pigment was changed to 60 parts. Regarding the capsulated coloring material in Liquid Dispersions I, J, K and L, the approximate content of the organic polymer to the carbon black was about 1%, 5%, 10%, and 20%, respectively.

Content of organic polymer to the carbon black:

Liquid Dispersion I: 1%

Liquid Dispersion J: 5%

Liquid Dispersion K: 10%

Liquid Dispersion L: 20%

The solid matter of the respective liquid dispersions obtained by evaporation was subjected to infrared absorption spectrum measurement (FT-IR). From the measurement of the peak intensity ratio in the infrared absorption spectra, it was confirmed that a part of the pigment is uncovered substantially in the respective dispersions.

The components below were mixed (total amount: 100 parts) and stirred well to dissolve the components. Then the mixture was filtered with pressure through a microfilter of the pore size 3 μm (produced by Fuji Film Co.) to prepare black inks of the present invention.

(Black ink 9)

| | |
|---|---|
| Pigment Liquid Dispersion I | 33.7 parts |
| Trimethylolpropane | 6 parts |
| Glycerin | 6 parts |
| Diethylene glycol | 6 parts |
| Acetylene glycol-ethylene oxide adduct (trade name: Acetylenol EH; produced by Kawaken Fine Chemical K.K.) | 0.2 part |
| Water | Balance |

(Black Ink 10)

The black ink was prepared in the same manner except that 35.1 parts of Pigment Liquid Dispersion J was used in place of Pigment Liquid Dispersion I.

(Black Ink 11)

The black ink was prepared in the same manner except that 37.0 parts of Pigment Liquid Dispersion K was used in place of Pigment Liquid Dispersion I.

(Black Ink 12)

The black ink was prepared in the same manner except that 41.7 parts of Pigment Liquid Dispersion L was used in place of Pigment Liquid Dispersion I.

Comparative Ink 5

A black ink was prepared in the same manner except that 33 parts of a non-encapsuled self-dispersible pigment liquid dispersion was used in place of Pigment Liquid Dispersion I.

Comparative Ink 6

A capsuled pigment-containing liquid dispersion was prepared in the same manner as Liquid Dispersion L except that the amount of the resin solution was changed from 11.6 parts to 17.5 parts in the preparation step of the liquid dispersion L in Example 3. A black ink as Comparative Ink 6 was prepared in the same manner as Black Ink 9 except that 47.6 parts of the above liquid dispersion was used in place of Pigment Liquid Dispersion I.

In Comparative Ink 5, the content of the organic polymer to the carbon black was 0%. In Comparative Ink 6, the content of the organic polymer to the carbon black was about 30%. The state of coverage of the pigment with the organic polymer in Comparative Inks 5 and 6 was examined by the FT-IR. As the results, in Comparative Ink 5, the coloring material was partly uncovered, whereas in Comparative Ink 6, the coloring material was substantially entirely covered.

Black Inks 9 to 12 and Comparative Inks 5 and 6 were evaluated for the same test items according to the same evaluation standard as in Example 1. The results are shown in Table 3.

As shown in Table 3, the ink of the present invention gives high print density and high rub resistance in ink-jet printing.

Example 4

The components below were mixed (total amount: 100 parts) and stirred well to dissolve the components. Then the mixture was filtered with pressure through a microfilter of the pore size 3 μm (produced by Fuji Film Co.) to prepare black ink 13 of the present invention.
(Black Ink 13)

| Pigment Liquid Dispersion A | 33.7 parts |
|---|---|
| Ammonium benzoate | 1 part |
| Trimethylolpropane | 6 parts |
| Glycerin | 6 parts |
| Diethylene glycol | 6 parts |
| Acetylene glycol-ethylene oxide adduct (trade name: Acetylenol EH; produced by Kawaken Fine Chemical K.K.) | 0.2 part |
| Water | Balance |

(Black Ink 14)

Black Ink 14 was prepared in the same manner except that 35.1 parts of Pigment Liquid Dispersion B was used in place of Pigment Liquid Dispersion A.
(Black Ink 15)

Black Ink 15 was prepared in the same manner except that 37.0 parts of Pigment Liquid Dispersion C was used in place of Pigment Liquid Dispersion A.
(Black Ink 16)

Black Ink 16 was prepared in the same manner except that 41.7 parts of Pigment Liquid Dispersion D was used in place of Pigment Liquid Dispersion A.

Comparative Ink 7

A black ink as Comparative Ink 7 was prepared in the same manner as Black Ink 13 except that 33 parts of a pigment dispersion was used which contained the above-mentioned self-dispersible type carbon black at a ratio of 15% by weight, in place of Pigment Liquid Dispersion A.

Comparative Ink 8

A capsuled pigment-containing liquid dispersion was prepared in the same manner as Liquid Dispersion D except that the amount of the resin solution was changed from 11.6 parts to 17.5 parts in the preparation step of the liquid dispersion D in Example 1. A black ink as Comparative Ink 8 was prepared in the same manner as Black Ink 13 except that 47.6 parts of the above liquid dispersion was used in place of Pigment Liquid Dispersion A.

In Comparative Ink 7, the content of the organic polymer to the carbon black was 0%. In Comparative Ink 8, the content of the organic polymer to the carbon black was about 30%. The state of covering of the pigment with the organic polymer in Comparative Inks 7 and 8 was examined by the FT-IR. As the results, in Comparative Ink 7, the coloring material was partly uncovered, whereas in Comparative Ink 8, the coloring material was substantially entirely covered.

Black Inks 13 to 16 and Comparative Inks 7 and 8 were evaluated for the same test items according to the same evaluation standard as in Example 1. Further, in this Example, the bleeding was evaluated according to the method below. The test results are shown in Table 4.
[3] Bleeding Test The ink set below was used in the evaluation of the bleeding.
(Yellow Ink)

The components below were mixed and dissolved by sufficient stirring. The solution was filtered with pressure through a microfine filter (produced by Fuji Photo Film Co.) of pore size 0.2 μm to obtain an yellow ink.

| Acetylene glycol-ethylene oxide adduct (trade name: Acetylenol EH; produced by Kawaken Fine Chemical K.K.) | 1 part |
|---|---|
| Diethylene glycol | 10 parts |
| Glycerin | 5 parts |
| C.I. Direct Yellow 86 | 3 parts |
| Water | 81 parts |

(Magenta Ink)

A magenta ink was prepared with the components below in the same manner as the above yellow ink.

Acetylene glycol-ethylene oxide adduct 1 part (trade name: Acetylenol EH;

produced by Kawaken Fine Chemical K.K.)

| Diethylene glycol | 10 parts |
|---|---|
| Glycerin | 5 parts |
| C.I. Acid Red 35 | 3 parts |
| Water | 81 parts |

(Cyan ink)

A cyan ink was prepared with the components below in the same manner as the above yellow ink.

| Acetylene glycol-ethylene oxide adduct (trade name: Acetylenol EH; produced by Kawaken Fine Chemical K.K.) | 1 part |
|---|---|
| Diethylene glycol | 10 parts |
| Glycerin | 5 parts |
| C.I. Acid Blue 9 | 3 parts |
| Water | 81 parts |

The bleeding test was conducted with the ink sets of combination of the above yellow, magenta, and cyan inks, and one of the aforementioned Black Inks 13 to 16 and Comparative Inks 7 and 8.

In 10 cm square area, solid printing was conducted with the black inks and the color inks in 5 mm ×5 mm squares adjacent alternately. The boundaries between the black solid print areas and the color solid print areas were examined, and the bleeding at the boundaries was evaluated according to the standards below.

a: The boundary lines between the colors are sharp without feathering or color mixing b: The boundary lines between the colors are observed with some feathering or color mixing on some kind of paper c: The boundary lines are not clear.

The evaluation results are shown in Table 4.

As shown in Table 4, the ink of the present invention gives high character quality, high print density and high rub resistance, and prevents bleeding effectively in ink-jet printing, or other printing.

In the above Examples, carbon black was used as the pigment for specific explanation of the present invention. However, the present invention is similarly effective in the printing with an organic pigment as the coloring material.

TABLE 1

Evaluation Results

|  | Print density | Rub resistance |
| --- | --- | --- |
| Black Ink 1 | a | b |
| Black Ink 2 | b | a |
| Black Ink 3 | b | a |
| Black Ink 4 | b | a |
| Comparative Ink 1 | a | c |
| Comparative Ink 2 | c | a |

TABLE 2

Evaluation Results

|  | Print density | Rub resistance |
| --- | --- | --- |
| Black Ink 5 | a | b |
| Black Ink 6 | b | a |
| Black Ink 7 | b | a |
| Black Ink 8 | b | a |
| Comparative Ink 3 | a | c |
| Comparative Ink 4 | c | a |

TABLE 3

Evaluation Results

|  | Print density | Rub resistance |
| --- | --- | --- |
| Black Ink 9 | a | b |
| Black Ink 10 | b | a |
| Black Ink 11 | b | a |
| Black Ink 12 | b | a |
| Comparative Ink 5 | a | c |
| Comparative Ink 6 | c | a |

TABLE 4

Evaluation Results

|  | Print density | Rub resistance | Bleeding |
| --- | --- | --- | --- |
| Black Ink 13 | a | b | a |
| Black Ink 14 | a | a | a |
| Black Ink 15 | a | a | a |
| Black Ink 16 | b | a | a |
| Comparative Ink 7 | a | c | a |
| Comparative Ink 8 | c | a | a |

What is claimed is:

1. An aqueous ink comprising a water insoluble coloring material encapsulated with an organic polymer, wherein the coloring material encapsulated with the organic polymer contains the organic polymer in an amount of from 1 to 20% by weight to the water insoluble coloring material.

2. An aqueous ink comprising a coloring material encapsulated with an organic polymer, wherein a part of the coloring material's surface is substantially exposed.

3. An aqueous ink comprising a self-dispersible organic pigment or self-dispersible carbon black encapsulated with an organic polymer, wherein the encapsulated pigment or encapsulated carbon black contains the organic polymer in an amount of from 1 to 20% by weight to the pigment or the carbon black.

4. An aqueous ink comprising a self-dispersible organic pigment or self-dispersible carbon black encapsulated with an organic polymer, wherein a part of the self-dispersible pigment's surface or the self-dispersible carbon black's surface is substantially exposed.

5. An aqueous ink comprising a self-dispersible organic pigment or a self-dispersible carbon black encapsulated with an organic polymer, wherein the pigment or the carbon black encapsulated with an organic polymer has an absorption peak in an infrared absorption spectrum, the peak being assigned to a functional group attached to the surface of the self-dispersible pigment or the self-dispersible carbon black.

6. An aqueous ink comprising a self-dispersible organic pigment or self-dispersible carbon black encapsulated with an organic polymer, wherein the self-dispersible organic pigment or the self-dispersible carbon black encapsulated with an organic polymer has an absorption peak in an infrared absorption spectrum, and no new peaks appear even when the organic polymer encapsulating the self-dispersible polymer or the self-dispersible carbon black is removed.

7. The aqueous ink according to any one of claims 3 to 6, wherein the self-dispersible organic pigment or the self-dispersible carbon black has at least one hydrophilic group at the surface thereof, and the hydrophilic group is bonded directly or through another atomic group to the surface.

8. The aqueous ink according to claim 7, wherein the hydrophilic group is at least one selected from the group consisting of —COOM$_1$, —SO$_3$M$_1$, and —PO$_3$H(M$_1$)$_2$, where M$_1$ is a hydrogen atom, an alkali metal, ammonium, or an organic ammonium.

9. The aqueous ink according to claim 7, wherein the atomic group is selected from the group consisting of an alkylene group of 1–12 carbons, a substituted phenylene group, an unsubstituted phenylene group, a substituted naphthylene group, and an unsubstituted naphthylene group.

10. The aqueous ink according to claim 7, wherein the hydrophilic group of the self-dispersible organic pigment or the self-dispersible carbon black is a carboxylic group.

11. The aqueous ink according to any one of claims 1 to 6, wherein the organic polymer has a nonionic or anionic group.

12. The aqueous ink according to claim 1, wherein the organic polymer has a number-average molecular weight of not lower than 2000.

13. The aqueous ink according to any one of claims 1 to 6, wherein the coloring material, self-dispersible organic pigment or self-dispersible carbon black encapsulated with the organic polymer has an average particle diameter of from 50 nm to 180 nm.

14. The aqueous ink according to any one of claims 1 to 6, wherein the ink contains at least one salt selected from the group consisting of (M$_2$)$_2$SO$_4$, CH$_3$COO(M$_2$), Ph—COO(M$_2$), (M$_2$)NO$_3$, (M$_2$)Cl, (M$_2$)Br, (M$_2$)I, (M$_2$)$_2$SO$_3$, and (M$_2$)$_2$CO$_3$, where M$_2$ is an alkali metal, ammonium, or an organic ammonium, and Ph is a phenyl group.

15. The aqueous ink according to claim 14, wherein the ink contains the salt at a content ranging from 0.05% by weight to 10% by weight based on the total weight of the ink.

16. The aqueous ink according to claim 15, wherein the ink contains the salt at a content ranging from 0.1% by weight to 5% by weight based on the total weight of the ink.

17. An ink set for color printing comprising inks of a black ink, a yellow ink, a magenta ink, and a cyan ink, wherein at least one of the inks is the aqueous ink stated in any one of claims 1 to 6.

18. An ink cartridge, comprising an ink tank holding an ink stated in any one of claims 1 to 6.

19. A printing unit having a holder for holding an ink, and a head for ejecting the ink, wherein the holder holds the ink set forth in any one of claims 1 to 6.

20. An image printing apparatus having a container containing the ink according to any one of claims 1 to 6, and a head for ejecting the ink.

21. An ink-jet printing method, comprising the steps of ejecting the ink according to any one of claims 1 to 6 toward a printing medium surface and attaching the ink onto the printing medium surface.

22. The ink-jet printing method according to claim 21, wherein the ink is ejected by thermal energy.

23. The ink-jet printing method according to claim 21, wherein the ink is ejected by mechanical energy.

24. A capsulated coloring material comprising a self-dispersible organic pigment or self-dispersible carbon black encapsulated with an organic polymer, wherein the capsulated coloring material has a peak in an infrared absorption spectrum, the peak being assigned to a functional group attached to the surface of the self-dispersible pigment or the self-dispersible carbon black.

25. A capsulated coloring material comprising a self-dispersible organic pigment or self-dispersible carbon black encapsulated with an organic polymer, wherein the capsulated coloring material has an absorption peak in an infrared absorption spectrum, and no new absorption peak appears even when the organic polymer encapsulating the self-dispersible organic pigment or the self-dispersible carbon black is removed.

* * * * *

UNITED STATES PATENT AND TRADEMARK OFFICE
CERTIFICATE OF CORRECTION

PATENT NO. : 6,511,534 B1
DATED : January 28, 2003
INVENTOR(S) : Shinya Mishina et al.

It is certified that error appears in the above-identified patent and that said Letters Patent is hereby corrected as shown below:

Column 1,
Line 9, "The. Present." should read -- The present --.

Column 3,
Line 2, "suled." should read -- suled --.
Line 32, "embodiments" should read -- embodiments, --.

Column 4,
Line 59, "is" should read -- is an --.

Column 6,
Line 15, "qunacridone" should read -- quinacridone --.
Line 20, "pyrenthrone" should read -- pyranthrone -- (both occurrences).
Line 58, "groups" should read -- group --.

Column 7,
Line 1, "different" should read -- a different --.
Line 41, "a gaseous" should read -- A gaseous --.

Column 8,
Line 16, "dispersed; Emulsion" should read -- dispersed; ¶ Emulsion --.
Line 29, "methycelluloe," should read -- methylcellulose, --.

Column 9,
Line 16, "epoxy" should read -- and epoxy --.
Line 43, "without" should read -- without a --.

Column 10,
Line 3, "has" should read -- have --.
Line 12, "is" should read -- are --.

Column 12,
Line 33, "is" should be deleted.

Column 15,
Line 49, "53 In" should read -- 53. In --.

UNITED STATES PATENT AND TRADEMARK OFFICE
CERTIFICATE OF CORRECTION

PATENT NO. : 6,511,534 B1
DATED : January 28, 2003
INVENTOR(S) : Shinya Mishina et al.

It is certified that error appears in the above-identified patent and that said Letters Patent is hereby corrected as shown below:

Column 16,
Line 17, "71 The" should read -- 71. The --.

Column 17,
Line 6, "black, inks" should read -- black inks, --.
Line 49, "1010 ,ink-jet" should read -- 1010, ink-jet --.

Column 19,
Line 13, "connection" should read -- connecting --.
Line 52, "Fc" should read -- $F_C$ --.
Line 53, "FM" should read -- $F_M$ --.

Column 20,
Line 34, "tend" should read -- tends --.
Line 44, "of" should read -- of the --.

Column 23,
Line 51, "Microcapsule" should read -- Microcapsules --.

Column 25,
Line 60, "Microcapsule" should read -- Microcapsules -- and "was" should read -- were --.

Column 27,
Line 18, "Microcapsule" should read -- Microcapsules -- and "was" should read -- were --.
Line 20, "P-hydroxyethyl" should read -- β-hydroxyethyl --.

Column 30,
Line 14, "Acetylene glycol-ethylene oxide adduct 1 part" should read
-- Acetylene glycol-ethylene oxide adduct 1 part --.

UNITED STATES PATENT AND TRADEMARK OFFICE
CERTIFICATE OF CORRECTION

PATENT NO. : 6,511,534 B1
DATED : January 28, 2003
INVENTOR(S) : Shinya Mishina et al.

It is certified that error appears in the above-identified patent and that said Letters Patent is hereby corrected as shown below:

<u>Column 30 (cont'd),</u>
Line 20, should be deleted.

Signed and Sealed this

Second Day of December, 2003

JAMES E. ROGAN
*Director of the United States Patent and Trademark Office*